US011261862B2

(12) United States Patent
Caldwell et al.

(10) Patent No.: US 11,261,862 B2
(45) Date of Patent: Mar. 1, 2022

(54) HYDROSTATIC APPARATUS AND METHOD OF OPERATING THE SAME

(71) Applicant: ARTEMIS INTELLIGENT POWER LIMITED, Loanhead (GB)

(72) Inventors: Niall James Caldwell, Loanhead (GB); Matthew Green, Loanhead (GB); Jill MacPherson, Loanhead (GB)

(73) Assignee: ARTEMIS INTELLIGENT POWER LIMITED, Loanhead (GB)

( * ) Notice: Subject to any disclaimer, the term of this patent is extended or adjusted under 35 U.S.C. 154(b) by 0 days.

(21) Appl. No.: 16/565,002

(22) Filed: Sep. 9, 2019

(65) Prior Publication Data

US 2020/0080551 A1 Mar. 12, 2020

(30) Foreign Application Priority Data

Sep. 10, 2018 (EP) ...................................... 18193575

(51) Int. Cl.
| | | |
|---|---|---|
| *F04B 49/22* | (2006.01) | |
| *E02F 9/22* | (2006.01) | |
| *F04B 7/00* | (2006.01) | |

(52) U.S. Cl.
CPC ............ *F04B 49/22* (2013.01); *E02F 9/2235* (2013.01); *E02F 9/2246* (2013.01); *F04B 7/0076* (2013.01)

(58) Field of Classification Search
CPC ..... E02F 9/2232; E02F 9/2235; F04B 7/0076; F04B 49/22; F04B 49/225
See application file for complete search history.

(56) References Cited

U.S. PATENT DOCUMENTS 3,779,673 A * 12/1973 Ahern ....................... F03C 2/08
418/61.1
5,429,089 A 7/1995 Thornberg et al.
(Continued)

FOREIGN PATENT DOCUMENTS

DE 102013221683 A1 4/2015
EP 0494236 12/1995
(Continued)

OTHER PUBLICATIONS

Mancini et al., G., "Dynamic Feedforward Control of a Diesel Engine Based on Optimal Transient Compensation Maps," Energies, 2014, 7, pp. 5400-5424.

*Primary Examiner* — Kenneth Bomberg
*Assistant Examiner* — Matthew Wiblin
(74) *Attorney, Agent, or Firm* — Hauptman Ham, LLP

(57) ABSTRACT

A prime mover and a plurality of hydraulic actuators, a hydraulic machine having a rotatable shaft in driven engagement with the prime mover and comprising working chambers, a hydraulic circuit between working chambers of the hydraulic machine and the hydraulic actuators, each working chamber of the hydraulic machine comprising a low-pressure and high-pressure valves regulating the flow of hydraulic fluid between the working chamber and a corresponding low-pressure manifold and a high-pressure manifold. The hydraulic machine being configured to actively control the low-pressure valves of the working chambers to select the net displacement of hydraulic fluid by each working chamber on each cycle of working chamber volume, and thereby the net displacement of hydraulic fluid by the working chambers, responsive to a demand signal, wherein the apparatus further comprises a controller configured to calculate the demand signal in response to a measured property of the hydraulic circuit or actuators.

22 Claims, 14 Drawing Sheets

(56) References Cited

U.S. PATENT DOCUMENTS

| | | | |
|---|---|---|---|
| 5,525,043 A | 6/1996 | Lukich | |
| 5,576,962 A | 11/1996 | Ferguson et al. | |
| 5,671,137 A | 9/1997 | Ishino et al. | |
| 5,873,427 A | 2/1999 | Ferguson et al. | |
| 5,951,258 A | 9/1999 | Lueschow et al. | |
| 6,010,309 A | 1/2000 | Takamura et al. | |
| 6,385,970 B1 | 5/2002 | Kuras et al. | |
| 6,568,126 B2 | 5/2003 | Womack | |
| 6,634,450 B1 | 10/2003 | Fukumura et al. | |
| 7,146,263 B2 | 12/2006 | Guven et al. | |
| 8,175,790 B2 | 5/2012 | Stemler et al. | |
| 8,192,175 B2 * | 6/2012 | Kuttler | F04B 49/22 417/290 |
| 8,347,621 B2 * | 1/2013 | Rampen | F04B 17/05 60/468 |
| 8,348,627 B2 * | 1/2013 | Rampen | F04B 49/243 417/57 |
| 9,494,169 B2 | 11/2016 | Murakami et al. | |
| 2003/0006076 A1 | 1/2003 | Tamor | |
| 2008/0282583 A1 | 11/2008 | Koellner et al. | |
| 2009/0123313 A1 * | 5/2009 | Armstrong | F04C 14/24 418/1 |
| 2010/0154400 A1 | 6/2010 | Krajnik et al. | |
| 2013/0009612 A1 * | 1/2013 | Caldwell | F03D 15/00 322/40 |
| 2013/0061588 A1 | 3/2013 | Jagoda | |
| 2013/0257049 A1 * | 10/2013 | Taylor | F03D 9/255 290/43 |
| 2013/0325293 A1 | 12/2013 | Jacobson | |
| 2014/0054902 A1 | 2/2014 | Kawaguchi et al. | |
| 2014/0188373 A1 | 7/2014 | Kawaguchi et al. | |
| 2015/0240451 A1 | 8/2015 | Dhall et al. | |
| 2015/0267697 A1 | 9/2015 | Gorman et al. | |
| 2015/0315766 A1 | 11/2015 | Take | |
| 2016/0025023 A1 | 1/2016 | Kim et al. | |
| 2016/0102624 A1 | 4/2016 | Were et al. | |
| 2016/0208898 A1 * | 7/2016 | Caldwell | F04B 11/00 |
| 2016/0340871 A1 | 11/2016 | Ohkubo et al. | |
| 2017/0009753 A1 * | 1/2017 | Pfaff | F04B 1/04 |
| 2017/0284388 A1 * | 10/2017 | Caldwell | F15B 11/0426 |
| 2017/0322260 A1 | 11/2017 | Ellwein et al. | |
| 2018/0100521 A1 | 4/2018 | Richer | |
| 2018/0135605 A1 | 5/2018 | Zeman et al. | |
| 2018/0163374 A1 * | 6/2018 | Imura | E02F 9/2066 |
| 2018/0245609 A1 * | 8/2018 | Caldwell | F04B 49/06 |
| 2019/0010965 A1 * | 1/2019 | Green | E02F 9/2246 |

FOREIGN PATENT DOCUMENTS

| | | |
|---|---|---|
| EP | 0719929 | 7/1996 |
| EP | 2055945 A1 | 5/2009 |
| EP | 2479351 | 7/2012 |
| EP | 2615212 | 7/2013 |
| EP | 2851586 A1 | 3/2015 |
| EP | 2985390 | 2/2016 |
| EP | 3258087 A1 | 12/2017 |
| GB | 2477996 | 8/2011 |
| JP | 2008255699 | 10/2008 |
| WO | 02088532 A2 | 11/2002 |
| WO | WO2013130768 | 9/2013 |
| WO | WO2015073330 | 5/2015 |
| WO | WO2017122024 | 7/2017 |
| WO | 2017/144875 A1 | 8/2017 |

\* cited by examiner

HYDROSTATIC APPARATUS AND METHOD OF OPERATING THE SAME

PRIORITY CLAIM

This application claims priority to European Patent Application Serial No. 18193575.0, filed Sep. 10, 2018, which is incorporated herein by reference in its entirety.

FIELD OF THE INVENTION

The invention relates to industrial machines and vehicles such as excavators, with hydraulic actuators driven by an electronically commutated hydraulic machine driven in turn by a prime mover.

BACKGROUND TO THE INVENTION

Industrial vehicles with multiple hydraulically powered actuators are in common use around the world. Industrial vehicles such as excavators typically have at least two tracks for movement, a rotary actuator (e.g. a motor) for rotating the cab of the vehicle relative to the base which comprises the tracks, rams for controlling the movement of an arm (e.g. an excavator arm) including at least one ram for the boom, and at least one for the stick (arm), and at least two actuators for controlling movement of a tool such as a bucket.

Each of these actuators represents some hydraulic load on a prime mover (e.g. an engine such as an electric motor, or more typically a diesel engine) of the vehicle and must be supplied by one or more working chambers (e.g. chambers defined by cylinders, within which pistons reciprocate in use) of a hydraulic machine driven by the prime mover.

The invention seeks to provide improved hydraulic control systems for controlling multiple hydraulically powered actuators. Some aspects of the invention seek to provide hydraulic control systems which have advantages of energy efficiency. Advantageously, implementing the improved hydraulic control systems means energy provided by a prime mover is used more efficiently to perform work functions, thus providing fuel savings.

SUMMARY OF THE INVENTION

According to a first aspect of the invention there is provided an apparatus (e.g. an excavator) comprising a prime mover (e.g. an engine) and a plurality of hydraulic actuators, a hydraulic machine having a rotatable shaft in driven engagement with the prime mover and comprising a plurality of working chambers having a volume which varies cyclically with rotation of the rotatable shaft (e.g. each chamber is defined by a cylinder within which a piston reciprocates in use),
a hydraulic circuit extending between a group of one or more (optionally two or more) working chambers of the hydraulic machine and one or more (optionally two or more) of the hydraulic actuators,
each working chamber of the hydraulic machine comprising a low-pressure valve which regulates the flow of hydraulic fluid between the working chamber and a low-pressure manifold and a high-pressure valve which regulates the flow of hydraulic fluid between the working chamber and a high-pressure manifold,
the hydraulic machine being configured to actively control at least the low-pressure valves of the group of one or more working chambers to select the net displacement of hydraulic fluid by each working chamber on each cycle of working chamber volume, and thereby the net displacement of hydraulic fluid by the group of one or more working chambers, responsive to a demand signal.

The hydraulic machine may be one or more electronically commutated machines (ECM). By an ECM we refer to a hydraulic fluid working machine comprising a rotatable shaft and one or more working chambers (e.g. chambers defined by cylinders, within which pistons reciprocate in use) having a volume which varies cyclically with rotation of the rotatable shaft, each working chamber having a low-pressure valve which regulates the flow of hydraulic fluid between the working chamber and a low-pressure manifold and a high-pressure valve which regulates the flow of hydraulic fluid between the working chamber and a high-pressure manifold. The reciprocation of the pistons may be caused by direct interaction with an eccentric on the rotatable shaft, or with a second rotatable shaft, the second rotatable shaft being rotatably connected to the rotatable shaft. A plurality of ECMs with linked rotatable shafts (e.g. common shafts) driven by the prime mover may function together as the hydraulic machine.

The apparatus may be a vehicle, typically an industrial vehicle. For example, the apparatus may be an excavator, a telehandler or a backhoe loader.

The invention extends to a method of operating the apparatus comprising applying a torque limit to the one or more hydraulic machines. The apparatus may comprise a controller which may be operable to apply a torque limit to the one or more hydraulic machines.

Typically, the hydraulic machine torque limit will be below a prime mover torque limit in dependence on a current prime mover speed (e.g. the speed of rotation of the rotatable shaft). The controller (e.g. a prime mover controller (e.g. engine controller) or a hydraulic machine controller) may be operable to receive a measurement of current prime mover speed and determine a corresponding prime mover torque limit, typically with reference to a lookup table containing a torque speed curve. The method may comprise receiving a measurement of current prime mover speed and determining a corresponding prime mover torque limit, typically with reference to a lookup table containing a torque speed curve.

Alternatively or additionally, the (prime mover or hydraulic machine) controller may be operable to receive a measurement of current machine speed and determine a corresponding machine torque limit, typically with reference to a lookup table containing a torque speed curve. The method may comprise receiving a measurement of current machine speed and determine a corresponding machine torque limit, typically with reference to a lookup table containing a torque speed curve.

Where the prime mover is an engine having a turbocharger, the prime mover controller may further take into account, and the method may comprise taking into account, one or more parameters associated with the turbocharger. For example, where the turbocharger limits how quickly an engine changes its torque output (e.g. due to the time constant of the turbocharger induction system and/or the turbocharger inertia) the prime mover controller may apply, and the method may comprise applying, an additional temporary torque limit which is lower than the prime mover torque limit. The hydraulic machine controller may be operable to cause the hydraulic machine to implement, and the method may comprise implementing, one or more (typically two or more) rates of change of torque, optionally in dependence on the RPM, the current torque, the additional temporary torque limit, the maximum prime mover torque and/or a safety factor. The one or more rates of change of torque typically comprises (e.g. at least) a first rate of change of torque and a second rate of change of torque. The hydraulic machine controller may be operable to implement, and the method may comprise implementing, a first rate of change of hydraulic machine torque when the prime mover is operating below an additional temporary torque limit and a second rate of change of torque when the prime mover is operating at or above the additional temporary torque limit, optionally (e.g. typically) wherein the first rate of change of torque is faster than the second rate of change of torque.

Where the prime mover is configured to provide displacement to two or more actuators, the controller (e.g. hydraulic machine controller) may be configured to apply, and the method may comprise applying, a different torque limit on the ECM in response to a demand associated with each actuator. Alternatively, the controller (e.g. hydraulic machine controller) may be configured to apply, and the method may comprise applying, substantially the same torque limit on the prime mover in response to a demand associated with each actuator.

The controller (e.g. hydraulic machine controller) may receive one or more signals (e.g. signals associated with a measurement of speed error, available torque, engine load, one or more pressure measurements, etc) in use and thereby determines the current torque applied to the ECM and may subsequently increase or decrease the torque limit in response to the one or more signals. The method may comprise receiving one or more signals (e.g. signals associated with a measurement of speed error, available torque, engine load, one or more pressure measurements, etc) and thereby determining the current torque applied to the ECM and may comprise subsequently increasing or decreasing the torque limit in response to the one or more signals.

The controller (e.g. hydraulic machine controller) may be configured to receive a measurement of outlet pressure and a value representative of displacement demand and may thereby calculate an estimate of exerted torque (e.g. by calculating a product of outlet pressure and displacement demand). The method may comprise receiving a measurement of outlet pressure and a value representative of displacement demand and calculating an estimate of exerted torque (e.g. by calculating a product of outlet pressure and displacement demand).

The controller (e.g. hydraulic machine controller) may be configured to receive a measurement of the rotational speed of the rotatable shaft and a value representative of displacement demand and thereby calculate an estimate of the flow delivered (e.g. by calculating a product of displacement demand and speed of rotation of the rotatable shaft). The method may comprise receiving a measurement of the rotational speed of the rotatable shaft and a value representative of displacement demand and thereby calculating an estimate of the flow delivered (e.g. by calculating a product of displacement demand and speed of rotation of the rotatable shaft).

Where the controller (e.g. the hydraulic machine controller) is configured to receive a measurement of the rotational speed of the rotatable shaft and to calculate an estimate of exerted torque, the controller may further calculate an estimate of the mechanical power absorbed. The method may comprise receiving a measurement of the rotational speed of the rotatable shaft and calculating an estimate of exerted torque and optionally further calculating an estimate of the mechanical power absorbed.

Where the controller (e.g. the hydraulic machine controller) is configured to receive a measurement of the outlet pressure and calculate an estimate of the flow delivered, the controller may further calculate an estimate of the fluid power. The method may comprise receiving a measurement of the outlet pressure and calculating an estimate of the flow delivered and optionally further calculating an estimate of the fluid power.

Optionally, where the controller (e.g. the hydraulic machine controller) is configured to calculate an estimate of exerted torque and/or flow delivered and/or mechanical power absorbed and/or fluid power the controller may be configured to receive one or more further parameters associated with the hydraulic machine (e.g. volumetric displacement and mechanical efficiency, optionally as a function of pressure, speed, temperature, etc) and may take the one or more further parameters into account to thereby improve the accuracy of the estimate. The method may comprise receiving one or more further parameters associated with the hydraulic machine (e.g. volumetric displacement and mechanically efficiency, optionally taking into account (e.g. measurements of) pressure, speed, temperature etc.) to thereby improve the said estimate of the mechanical power absorbed or the fluid power.

The controller (e.g. the hydraulic machine controller) may be configured to receive a measurement of current pressure, calculate a displacement limit required to exert a torque at the said pressure and limit the output displacement such that it does not exceed the displacement limit to thereby limit the torque. The method may comprise receiving a measurement of current pressure, calculating a displacement limit required to exert a torque at the said pressure and limiting the output displacement such that it does not exceed the displacement limit to thereby limit the torque.

The controller (e.g. the hydraulic machine controller) may be configured to receive a measurement of current rotational speed of the rotatable shaft, calculate a displacement limit required to supply a flow at the said rotational speed of the rotatable shaft and limit the output displacement such that it does not exceed the displacement limit to thereby limit the flow. The method may comprise receiving a measurement of current rotational speed of the rotatable shaft, calculating a displacement limit required to supply a flow at the said rotational speed of the rotatable shaft and limit the output displacement such that it does not exceed the displacement limit to thereby limit the flow.

The controller (e.g. the hydraulic machine controller) may be configured to receive a measurement of current pressure, and current rotational speed of the rotatable shaft, and calculate a displacement limit required to absorb a power at the said pressure and rotational speed and limit the output displacement (such that it does not exceed the displacement limit to thereby limit the power). The method may comprise receiving a measurement of current pressure, and current rotational speed of the rotatable shaft, and calculating a displacement limit required to absorb a power at the said pressure and rotational speed and limit the output displacement (such that it does not exceed the displacement limit to thereby limit the power).

The controller (e.g. the hydraulic machine controller) may be configured to receive, and the method may comprise receiving, one or more signals indicative of a displacement, flow, pressure, power and/or torque demand. The one or more signals may be limited by one or more limiting functions, the one or more limiting functions typically being dependent on one or more further parameters (e.g. temperature). For example, the controller may receive, and the method may comprise receiving, a signal indicative of a flow demand of 100 L/min, wherein the signal indicative of the flow demand is limited by a pressure limit of 200 bar and a power limit of 20 kW, and the machine may be configured to output flow in response to that flow demand, up to a limit of 100 L/min, only when a measurement of pressure indicates that the pressure is at or below 200 bar and a measurement of power indicates that the power output is at or less than 20 kW. The one or more limiting functions may be non-linear limiting functions.

The controller (e.g. hydraulic machine controller) may be configured to receive (and/or calculate) an estimate of the available torque of the prime mover (e.g. the engine) and set a hydraulic machine torque limit wherein the torque limit is dependent on the prime mover speed. The method may comprise receiving and/or calculating an estimate of the available torque of the prime mover (e.g. the engine) and setting a hydraulic machine torque limit wherein the torque limit is dependent on the prime mover speed. For example, at relatively low prime mover speeds, the hydraulic machine torque limit may be selected to be zero to thereby prevent stall (e.g. engine stall); conversely, at relatively high prime mover speeds the hydraulic machine torque limit may be selected to prevent machine damage. Alternatively, at relatively high prime mover speeds the hydraulic machine torque limit may be increased to thereby increase the machine load, causing the prime mover speed to decrease until the machine load matches the available torque of the prime mover. This has the advantage of providing a temporary increase in available power until the prime mover speed is reduced. One skilled in the art will appreciate that a relatively high or low prime mover speed will be dependent on the individual prime mover and/or vehicle.

Where a vehicle comprises a prime mover in the form of an engine, the engine having a controller comprising an engine governor, the engine governor may comprise a variable speed setpoint and the controller may be configured to receive a measurement of engine speed droop to thereby calculate an estimate of engine load. The method may comprise implementing a variable speed setpoint of the engine. The method may comprise receiving a measurement of engine speed droop and thereby calculating an estimate of the engine load. Accordingly, the hydraulic machine torque limit may be limited by a limiting function wherein the limiting function is dependent on the measurement of engine speed droop.

It may be that there is a plurality of said groups of working chambers having respective demand signals, and wherein the controller implements the torque limit while independently varying the demand signals of two or more said groups of working chambers. This enables the controller to prioritise, and the method may comprise prioritising, the torque of one or more said groups of working chambers, or to maintain the torque of one or more said groups of working chambers at a predetermined (e.g. guaranteed, while sufficient prime mover torque is available) torque.

It may be that there is a plurality of said groups of working chambers (typically connected to a plurality of respective groups of one or more actuators) having respective demand signals, and wherein the controller implements the torque limit, and the method comprises implementing the torque limit, while prioritising the torque of one or more said groups of working chambers over the torque of one or more other said groups of working chambers by varying the respective demand signals of the respective groups of one or more working chambers.

It may be that there is a plurality of said groups of working chambers having respective demand signals, and wherein the controller implements the torque limit, and the method comprises implementing the torque limit, while prioritising the torque of one or more said groups of working chambers over the torque of one or more other said groups of working chambers.

It may be that there is a plurality of said groups of working chambers and wherein in at least some circumstances, the controller causes, and the method comprises causing, one or more of said groups of working chambers to carry out motoring cycles while one or more other of said groups of working chambers carry out pumping cycles, to thereby use torque from the motoring to supplement the engine torque and thereby assist the torque generated by said pumping.

It may be that the controller limits the torque, and the method may comprise limiting the torque, to implement a maximum torque slew rate, either of the group of one or more working chambers or the hydraulic machine as a whole.

It may be that the apparatus is configured to calculate the demand signal in response to a measured property of the hydraulic circuit or one or more actuators. Typically, the apparatus comprises a controller which is configured to calculate the demand signal in response to a measured property of the hydraulic circuit or one or more actuators.

The invention also extends to a method of operating the said apparatus comprising calculating the demand signal in response to a measured property of the hydraulic circuit or one or more actuators.

Typically, the method comprises detecting the flow and/or pressure requirement of at least one of the group of hydraulic actuators, or receiving a demand signal indicative of a demanded pressure or flow based on a pressure and/or flow demand of the group of one or more hydraulic actuators, and controlling the flow of hydraulic fluid from or to each of the group of one or more working chambers which is fluidically connected to the group of one or more hydraulic actuators, responsive thereto.

The apparatus (typically an excavator) may comprise a fluid manifold extending from said group of one or more working chambers to a group of one or more said hydraulic actuators and to a fluid container (e.g. a tank or conduit) through a throttle, and a pressure monitor configured to measure the pressure of hydraulic fluid in the manifold between the throttle and the group of one or more said hydraulic actuators. The controller may be configured to regulate the displacement of the group of one or more said working chambers which are in communication (e.g. via a fluid manifold) with the group of one or more said hydraulic actuators responsive to the measured pressure to thereby regulate the pressure of hydraulic fluid at the pressure monitor (e.g. through feedback control). The method may comprise regulating the displacement of the group of one or more working chambers responsive to the measured pressure to thereby regulate the pressure of hydraulic fluid at the pressure monitor. Thus, the apparatus typically has a negative flow control loop. Optionally, the apparatus may comprise a feedforward controller configured to calculate the demand signal in response to feedforward of a measured property of the hydraulic circuit or one or more actuators (e.g. in addition to or alternative to a feedback controller configured to calculate the demand signal in response to feedback of a measured property of the hydraulic circuit or one or more actuators).

The apparatus may comprise a throttle (hydraulically) connected in series with the open centre of one or more open-centre control valves, said open-centre control valves located in the hydraulic circuit intermediate the group of one or more working chambers and the one or more actuators. Typically, the open-centre control valves divert fluid flow from the throttle to the one or more actuators when actuated. It may be that the demand signal is determined responsive to a measurement of the pressure of hydraulic fluid at the throttle.

For example, the demand signal may be determined responsive to a measurement of pressure and/or a measurement of flow. The demand signal may comprise a measurement of pressure, the measurement of pressure being measured at the throttle. The demand signal may be indicative of a fraction of maximum displacement of hydraulic fluid by the group of one or more working chambers to be displaced per revolution of rotatable shaft. This is referred to herein as $F_d$. (Fraction of maximum displacement per revolution).

Typically, the controller (which may be a feedback controller) comprises a filter. The controller may calculate the demand signal in response to the measured property of the hydraulic circuit or one or more actuators by filtering a control signal based on the measured property of the hydraulic circuit or one or more actuators. The method may comprise calculating the demand signal in response to the measured property of the hydraulic circuit or one or more actuators by filtering a control signal based on the measured property of the hydraulic circuit or one or more actuators. For example, the control signal which is filtered may be a pressure signal, flow rate signal, actuator position signal etc.

The filter may be selected to reject frequencies in the measured property and/or to attenuate noise (e.g. pulsation noise) in the measured property, to thereby generate a filtered input and to subsequently determine the demand signal in dependence on the said filtered input.

The method may comprise measuring and/or modulating the operating parameters of the prime mover to thereby control the prime mover speed. Typically, the prime mover (typically an engine) comprises a prime mover control unit (PMCU), the PMCU typically comprising a prime mover speed governor. The prime mover speed governor may be operable to measure and/or modulate the operating parameters of the prime mover to thereby control the prime mover speed. The prime mover speed governor may be operable to receive (and the method may comprise receiving) one or more inputs from a user (optionally via a joystick) and/or from a predefined set of instructions (e.g. to prevent the prime mover speed from increasing beyond a predetermined upper threshold, optionally to prevent the prime mover speed from decreasing below a predetermined lower threshold).

The method may comprise varying one or more operating parameters of the apparatus (e.g. one or more parameters of the prime mover or of the hydraulic machine) responsive to an electrical signal received from one or more sensors. The PMCU may be configured to receive electrical signals from one or more sensors and optionally to subsequently evaluate the signals and optionally vary one or more operating parameters of the vehicle (optionally one or more parameters of the prime mover (e.g. the engine) and/or one or more parameters of the hydraulic machine). For example, the PMCU may be configured to receive (and the method may comprise receiving) electrical signals indicative of a crankshaft position and/or a speed of rotation of the rotatable shaft (e.g. as measured using a shaft sensor), one or more temperatures (e.g. a fuel temperature, an engine temperature, an exhaust air temperature, as measured using one or more thermometers or other temperature sensors), a mass-air-flow, a charge-air pressure, a fuel-air pressure, an accelerator pedal position, etc.

The prime mover is typically in driving engagement with the hydraulic machine. The prime mover has a rotatable shaft which is typically coupled to the rotatable shaft of the ECM (and to which the prime mover can apply torque). The prime mover (e.g. the engine) and the hydraulic machine may have a common shaft.

Where the apparatus is an excavator, the plurality of hydraulic actuators typically comprises (e.g. at least) two actuators for moving tracks (e.g. for movement of a vehicle, typically an excavator), a rotary actuator (e.g. a motor) (e.g. for rotating the cab of the excavator, relative to the base of the excavator, the base typically comprising the tracks), at least one ram actuator (e.g. for controlling an excavator arm, e.g. for the boom and/or the stick), and at least two further actuators (e.g. for controlling movement of a tool such as a bucket).

One or more low-pressure manifolds may extend to the working chambers of the hydraulic machine. One or more high-pressure manifolds may extend to the working chambers of the hydraulic machine. The hydraulic circuit typically comprises a said high-pressure manifold which extends between the said group of one or more working chambers and the said one or more actuators. The low-pressure manifold may be part of one or more said hydraulic circuits. By low pressure manifold and high pressure manifold we refer to the relative pressures in the manifolds.

It may be that at least the low-pressure valves (optionally the high-pressure valves, optionally both the low-pressure valves and the high-pressure valves) are electronically controlled valves, and the apparatus comprises a controller which controls the (e.g. electronically controlled) valves in phased relationship with cycles of working chamber volume to thereby determine the net displacement of hydraulic fluid by each working chamber on each cycle of working chamber volume. The method may comprise controlling the (e.g. electronically controlled) valves in phased relationship with cycles of working chamber volume to thereby determine the net displacement of hydraulic fluid by each working chamber on each cycle of working chamber volume.

The flow rate and/or pressure requirement of a group of one or more hydraulic actuators may be determined by measuring the flow rate of hydraulic fluid to or from the group of one or more hydraulic actuators, or the pressure of hydraulic fluid in or at an output or inlet of the one or more hydraulic actuators, for example. The flow rate and/or pressure requirement may be determined from one or more measured flow rates and/or measured pressures decreasing or being below an expected value. A decrease in flow rate and/or measured pressure from an expected value indicates that insufficient flow to or from the group of one or more hydraulic actuators is taking place. For example, it may be determined that the rate of flow of hydraulic fluid to an actuator is below an expected (e.g. target) value and a flow rate of hydraulic fluid to the actuator may be increased in response thereto. It may be determined that the rate of flow of hydraulic fluid from an actuator is above an expected (e.g. target) value (for example, as an arm or other weight is lowered) and a flow rate from the actuator may be reduced in response thereto. It may be that a pressure increase or decrease is detected at one or more hydraulic actuators and the group of one or more working chambers connected to the one or more hydraulic actuators are controlled to change (e.g. increase or decrease) the rate of flow of hydraulic fluid from the group of one or more working chambers to the one or more hydraulic actuators, or vice versa.

Groups of one or more working chambers may be dynamically allocated to respective groups of one or more hydraulic actuators to thereby change which one or more working chambers are connected to (e.g. a group of) hydraulic actuators, for example by opening or closing electronically controlled valves (e.g. high-pressure valves and low-pressure valves, described below), e.g. under the control of a controller. Groups of (e.g. one or more) working chambers are typically dynamically allocated to (respective) groups of (e.g. one or more) actuators to thereby change which working chambers of the machine are coupled to which hydraulic actuators, for example by opening and/or closing (e.g. electronically controlled) valves, e.g. under the control of a controller. The net displacement of hydraulic fluid through each working chamber (and/or each hydraulic actuator) can be regulated by regulating the net displacement of the working chamber or chambers which are connected to the hydraulic actuator or actuators. Groups of one or more working chambers are typically connected to a respective group of one or more said hydraulic actuators through a said manifold. Typically, the connection extends through one or more valves, such as normally open valves and/or spool valves (which may be open centre spool valves or closed centre spool valves in different embodiments).

The apparatus typically comprises a controller. The controller comprises one or more processors in electronic communication with memory, and program code stored on the memory. The controller may be distributed and may comprise two or more controller modules (e.g. two or more processors), for example the controller may comprise a hydraulic machine controller (comprising one or more processors in electronic communication with memory, and program code stored on the memory) which controls the hydraulic machine, and an apparatus controller (comprising one or more processors in electronic communication with memory, and program code stored on the memory) which controls the other components of the apparatus (for example, valves to change the flow path of hydraulic fluid).

Typically, the fluid manifold extends through a plurality of normally open valves. For example, the plurality of normally open valves may comprise one or more open-centre control valves having at least one inlet and more than one outlet wherein fluid may flow (e.g. directly) through the at least one inlet and at least one of the more than one outlets, unless a force is applied to close the valve. The open-centre control valves may comprise (e.g. be) normally open valves, for example, normally open spool valves, such as open-centre spool valves.

Open-centre spool valves comprise one or more ports which are openable (e.g. a normally open port and one or more actuator ports). Typically, the fluid connection between the group of one or more said working chambers and the group of one or more said hydraulic actuators extends through a further normally open valve, again typically a normally open spool valve, such as an open centre spool valve. A manually operable control (e.g. a joystick), is typically coupled to the one or both said normally open valves to regulate flow therethrough. Optionally, one or more hydraulic actuators may act in opposition, for example fluid may be directed to either end of a double-acting piston or ram.

Typically, the open-centre spool valves comprise one or more flow-through outlets through which fluid is directed in use. Typically, the open-centre control valves comprise a default valve position configured to cause fluid displaced by one of or more cylinders to flow (e.g. directly) through a central flow-through outlet to a tank. Typically, the open-centre control valves comprise one or more fluid-diverting positions, configured to cause fluid displaced by one or more cylinders to flow (e.g. directly) through a flow-through outlet to one or more actuators. In use, an input provided by a user (optionally by a controller) causes the position of the open-centre spool valve to be adjusted and to thereby cause flow to be diverted to the tank and/or to one or more actuators.

It may be that the pressure of or rate of flow of hydraulic fluid accepted by, or output by, each working chamber is independently controllable. It may be that the pressure of, or rate of flow of hydraulic fluid accepted by, or produced by each working chamber can be independently controlled by selecting the net displacement of hydraulic fluid by each working chamber on each cycle of working chamber volume. This selection is typically carried out by the controller.

Flow demand may, for example, be determined by detecting a pressure drop (e.g. by using pressure sensors) across a flow restriction (e.g. an orifice) arranged such that the flow through the orifice reduces when the total flow demand of all hydraulic actuators increases, or by direct flow measurement of the same flow using a flow sensing means such as a flow meter.

Flow and/or pressure demand may be sensed by measuring the pressure of hydraulic fluid at an input of a hydraulic actuator. Where a hydraulic actuator is a hydraulic machine, flow demand may be sensed by measuring the speed of rotation of a rotating shaft or speed of translation of a ram or angular velocity of a joint, for example. The sum of the measured pressures of flows may be summed or the maximum of the measured pressures or flows found.

The demand signal indicative of a demanded pressure or flow based on a pressure and/or flow demand of the hydraulic actuator may be a signal representing an amount of flow of hydraulic fluid, or pressure of hydraulic fluid, or the torque on the shaft of the machine or the shaft of a hydraulic actuator driven by the machine, or the power output of the machine or any other signal indicative of a demand related to the pressure or flow requirements of one or more hydraulic actuator.

Typically, the hydraulic machine is operable as a pump, in a pump operating mode or is operable as a motor in a motor operating mode. It may be that some of the working chambers of the hydraulic machine may pump (and so some working chambers may output hydraulic fluid) while other working chambers of the hydraulic machine may motor (and so some working chambers may input hydraulic fluid).

The controller may control the (e.g. electronically commutated) hydraulic machine. The controller may be configured to calculate the available power from the prime mover and to limit the net displacement of hydraulic fluid by the hydraulic machine driven by the prime mover, such that the net power demand does not exceed that available from the prime mover.

The controller typically comprises one or more processors and a memory storing program code executed by the controller in operation. The controller may calculate a power limit value, or a value related thereto (e.g. a maximum pressure, torque, flow, etc). The controller may be configured to implement a maximum rate of flow of hydraulic fluid through or pressure at a group of one or more hydraulic actuators.

It is known to provide an electronically commutated hydraulic machine with a very short response time. Although short response times are helpful in certain scenarios, they can also have drawbacks. For example, in some circumstances when response times are too short this can have a negative impact on controllability.

Accordingly, a further aspect of the invention provides a method of operating an apparatus, the apparatus comprising a (e.g. electronically commutated) hydraulic machine with one or more working chambers, prime mover (e.g. an engine, optionally a diesel engine) coupled to the hydraulic machine, wherein the method comprises selecting between two or more modes of operation, at least one first mode having a first step response time and/or comprising a first time constant and at least one second mode comprising a second step response time and/or having second time constant different to the first time constant. The second mode may further comprise a modified negative flow control system, the modified negative flow control system emulating an analogue pump and/or the response time of the first mode. There may be further modes (e.g. a third mode, a fourth mode, a fifth mode, etc) each associated with a different step response time and/or a different time constant.

Typically, the controller has at least two modes of operation, each mode of operation characterised by a (e.g. low-pass) filter with a different step response time and/or a different time constant.

Thus, there is at least one mode of operation in which the hydraulic machine responds more slowly to changes in the measured property. It may be that there are at least two modes with step change response times and/or time constants which differ by a factor of at least 2, or at least 4, or at least 10.

The at least two modes of operation may comprise at least one override mode characterised by a step response time and/or time constant that is shorter than the time constant of any other mode, wherein the controller is operable to implement the override mode in response to determination that an operating condition of the prime mover meets one or more override criteria. The operating condition may comprise (e.g. at least one of) a measured torque and/or a measured speed and/or a measured power. The operating condition may comprise a combination of a measured torque and/or a measured speed and/or a measured power. The override criteria might for example be that a measured torque and/or measured speed and/or a measured power exceeds a threshold or is a lower than a threshold.

The at least two modes of operation may comprise a second mode, wherein the second mode may comprise (e.g. be) a "slow mode" with a reaction time of more than 200 ms, or preferably more than 250 ms, or preferably more than 300 ms. Where the prime mover is an engine, the method may comprise activation of a "slow mode" when engine droop is detected and optionally subsequent activation of a "fast mode", e.g. when engine speed has recovered. This has the advantage of preventing the engine from stalling.

By engine droop we refer to a sustained decrease in the engine speed from the engine setpoint as the engine load is increased.

Where the feedback loop has a high gain and proportional control and the hydraulic circuit has a low compliance it may be very prone to instability. Such a system can be very sensitive to delays, perhaps of even 2 or 3 ms for example, whether caused by signal measurement and/or filtering of hardware responses. Accordingly, in some embodiments, the filter has may be a low pass filter with a time constant of 100-300 ms or a filter with a step change response of 100-300 ms.

It is known to meet torque demand by sharing output between multiple (e.g. electronically commutated) hydraulic machines. For example, an industrial machine having two (e.g. electronically commutated) hydraulic machines may be limited such that each hydraulic machine provides (at maximum) half of the required output (e.g. torque) to meet the demand. In addition, to prevent stalling, a safety factor is typically introduced to prevent the combined (e.g. summed) torque from the two or more hydraulic machines exceeding a torque maximum. Where the prime mover is an engine, this safety factor also helps to reduce engine droop and transient reductions in engine speed. This is inefficient because it not possible to use the full power output of the machine.

Typically, the method comprises selecting a prime mover speed setpoint (e.g. an engine speed setpoint), $S_{set\ point}$. At any time, the prime mover may be running at a speed that may be but is not necessarily the same as the prime mover speed setpoint. Accordingly, the method comprises measuring or determining the current prime mover speed, $S_{current}$. The controller may be configured to select a prime mover setpoint (e.g. an engine speed setpoint), $S_{set\ point}$. The controller may configured to receive a measurement of or to determine the current prime mover speed, $S_{current}$.

The engine may be caused to run at prime mover speed below the prime mover speed setpoint (e.g. at at least 90% of the prime mover speed setpoint, preferably at at least 95% of the prime mover speed set point).

Typically, the method comprises calculating a prime mover speed error (e.g. an engine speed error) ($\Delta S$). The controller may be configured to calculating a prime mover speed error (e.g. an engine speed error) ($\Delta S$). The prime mover speed error may be calculated according to the following equation:

$$S_{set\ point} - S_{current} = \Delta S \quad \text{(Equation 1)}$$

Accordingly, in a further aspect of the invention, the method may comprise selectively regulating the demand signal to implement a hydraulic machine torque limit. The controller may be configured to selectively regulate the demand signal to implement a hydraulic machine torque limit. The hydraulic machine torque limit may be variable.

Typically, the hydraulic machine torque limit varies with prime mover speed, since the torque that the prime mover can produce is also a function of prime mover speed.

The hydraulic machine torque limit may be calculated in dependence on a prime mover speed error (e.g. an engine speed error), optionally wherein the prime mover speed error is determined by comparing a measurement of prime mover speed (e.g. engine speed) and a prime mover speed setpoint (e.g. an engine speed setpoint).

Typically, the prime mover comprises a prime mover governor (e.g. an engine governor) which regulates the prime mover to a target speed determined responsive to an operator input. The target speed may be determined responsive to a torque limit defined in a database.

The method may comprise receiving an input hydraulic machine displacement signal and outputting an output hydraulic machine displacement signal which is selectively restricted to avoid exceeding a torque limit, taking into account a torque limit function and prime mover speed error (e.g. an engine speed error). The controller may be configured to process a hydraulic machine displacement signal and to calculate (e.g. output) a hydraulic machine displacement signal which is selectively restricted to avoid exceeding a torque limit, taking into account a torque limit function and prime mover speed error (e.g. an engine speed error) The hydraulic machine displacement signal may be representative (e.g. may comprise a numerical value proportional to) of a fraction of the maximum displacement per revolution of the rotatable shaft of the hydraulic machine ($F_d$).

It is known to provide industrial vehicles (e.g. excavators) comprising a plurality of pressure relief valves. Pressure relief valves prevent damage due to excess pressure during movement functions of industrial vehicles. It is also known to provide a plurality of pressure relief valves wherein different pressure relief valves have different functions. For example, respective pressure relief valves might be associated with the movement of each of an arm, a track motor, a swing motor, etc.

When the pressure limit ("PRV pressure", or Pressure Relief Valve pressure) is reached, a PRV opens, allowing excess hydraulic fluid to exit and thus preventing further increases in pressure. It prevents pressures from reaching unsafe levels in the system. However, this gives rise to inefficiencies in the system, since the fluid energy is turned into heat over the valve and is subsequently lost.

Accordingly, some embodiments of the invention seek to provide a method by which to avoid reaching the PRV pressure during use of a machine, or in some embodiments even to omit one or more (or all) PRVs. The controller may be configured to receive a measured pressure and to compare the measured pressure to a (predetermined) pressure limit and to limit displacement when the measured pressure is within a margin (which may for example be in the range of 70% to 100%) of the pressure limit. The method may comprise receiving a measured pressure and comparing the measured pressure to a (predetermined) pressure limit and limiting displacement when the measured pressure is within a margin (which may for example be in the range of 70% to 100%) of the pressure limit. The pressure limit may be a pressure limit of a system pressure limiter, such as a pressure relief valve. The method may comprising detecting current pressure, comparing the pressure to a PRV pressure and limiting displacement when the current pressure is within the margin of the PRV pressure.

Optionally, the controller may be configured to receive a measured pressure and to compare the measured pressure to a pressure limit. Optionally, the controller may be configured to receive a measured pressure and to compare the measured pressure to the pressure limit and to limit displacement when the measured pressure approaches or substantially equals the pressure limit.

Optionally, the pressure limit (and/or threshold pressure) may be the pressure at which a pressure relief valve will be actuated to release pressurised fluid. The pressure limited (and/or threshold pressure) may be a predetermined acceptable pressure.

Optionally, the pressure may be measured at a location in the hydraulic circuit which is not in fluid communication with a pressure relief valve.

In some embodiments, the vehicle (optionally an excavator) may not have any pressure relief valves however typically the vehicle will comprise a plurality of pressure relief valves (e.g. where dictated by safety provisions).

Typically, different PRVs are associated with different functions and hence will have different PRV opening pressures (for example, the PRV opening pressure for raising an arm of an excavator may be different to (e.g. higher or lower than) the PRV opening pressure for lowering an arm of an excavator).

The controller may be configured to receive demand and/or user commands and to take into account demand and/or user commands when determining whether the measured pressure is within a margin of the pressure limit. The method may comprise taking into account demand and/or user commands (e.g. commands input via one or more joysticks) when calculating where the measured pressure is within a margin of the pressure limit (i.e. the respective PRV opening pressure). For example, the pressure limit and/or the margin may vary with demand and/or user commands or other parameters, e.g. actuator position or speed of movement.

It is known to provide a vehicle (e.g. an excavator) wherein flow is supplied to allow actuation for many functions (e.g. excavator functions) simultaneously. In some circumstances, excessive flow may be directed to one or more functions (for example if a flow value stored in a look-up table associated with the said function is inaccurate). This could result in pressure reaching a PRV limit and excessive flow leaving via a PRV in order to prevent damage to parts of the hydraulic machine or other components in the hydraulic circuit. However, when flow leaves via a PRV, energy associated with that flow is lost, which results in inefficiencies. Another adverse effect of excess flow to a function could be increased pressure drop over the spool (but not reaching the PRV pressure). This causes large power loss over the spool.

The method may comprise measuring an input from a user (e.g. an input delivered via a joystick) to generate a control signal which is used to determine a displacement from the hydraulic machine, or at least the group of one or more working chambers. The controller may receive a user input and generate a control signal which is used to determine a displacement from the hydraulic machine, or at least the group of one or more working chambers This operates in open-loop mode, so there is no feedback system with which to correct an error. Such machines are typically very accurate.

The control signal may be a spool valve control signal (for example, a pilot pressure or a proportional activation signal) which determines how open the spool valves are. The control signal may be used to regulate a hydraulic fluid flow rate from the group of one or more working chambers to the one or more actuators.

It may be that the apparatus further comprises at least one spool valve in the hydraulic circuit, through which hydraulic fluid flows in use from the group of one or more working chambers to the one or more of the hydraulic actuators, and pressure sensors configured to measure the pressure of hydraulic fluid before and after the at least one spool valve, for example at the hydraulic machine outlet and at the one or more actuators.

The controller is typically configured to determine a pressure drop across the at least one spool valve from measurements of pressure from the pressure sensors, and to receive either a (measured) spool valve position signal, indicative of the position of the spool valve, or a spool valve control signal, and to limit the displacement of the one or more working chambers if the determined pressure drop exceeds a threshold pressure drop which threshold pressure drop is determined in dependence on the spool valve position signal or spool valve control signal respectively. The method typically comprises determining a pressure drop across the at least one spool valve from measurements of pressure from the pressure sensors, and receiving either a (measured) spool valve position signal, indicative of the position of the spool valve, or a spool valve control signal, and limiting the displacement of the one or more working chambers if the determined pressure drop exceeds a threshold pressure drop which threshold pressure drop is determined in dependence on the spool valve position signal or spool valve control signal respectively.

The threshold pressure drop is or is related to (e.g. within a predetermined margin of) an expected pressure drop. The expected pressure drop can be calculated in dependence on the spool valve position signal or spool valve control signal.

The threshold pressure drop may be determined by querying a look-up table. The threshold pressure drop may be an acceptable pressure drop. The threshold pressure drop may be an acceptable pressure drop given the flow indicated by the spool valve position signal or spool valve control signal. The pressure drop is indicative of the flow rate and so an excessive flow rate is indicative of flow in excess of what is expected given the spool valve position signal or spool valve control signal respectively. If excess flow is detected, the displacement of the group of one or more working chambers is limited.

The threshold pressure drop may be determined in dependence on one or more additional factors as well as spool valve position signal or spool valve control signal.

The pressure sensors may comprise a pressure sensor at the outlet of the group of one or more working chambers of the hydraulic machine and a pressure sensor at the input into one or more of the hydraulic actuators.

Typically, (e.g. spool) valves are normally closed and configured to be openable responsive to a user command (e.g. a user command input via a joystick) to thereby direct flow, optionally (for example), to one or more actuators. Spool valves typically comprise a main (e.g. central) port which may be open by default (i.e. normally open) to thereby provide a default flow path (e.g. a conduit) through which fluid displaced by one or more working chambers may flow, optionally to a tank and one or more further ports (e.g. connected to one or more actuators) which may be closed by default and which may be opened in response to a user or controller command. Spool valves typically comprise one or more further ports which may be closed by default (i.e. normally closed) and which may be opened in response to a user command (optionally a controller command). Typically, when a further port is opened the main (e.g. central) port is closed. It is possible to determine how open a port of a spool valve is by measuring a control signal associated with the spool valve (for example, the control signal may be a pilot pressure). It is also possible to prove a spool valve position sensor (which may for example determine the position of a spool valve member relative to a valve body).

The group of one or more working chambers may be connected to the one or more actuators through a specific port of a spool valve having a plurality of ports. In that case, it is the openness of that specific port which will determine the flow rate leading to the pressure drop which is to be measured.

Typically, the spool valves comprise a main port, which may be open by default, to thereby provide a default flow path through which fluid displaced by the group of one or more working chambers may flow, optionally to a tank, and one or more further ports which may be closed by default and which may be opened in response to a user or controller command. Said specific port may be a said main port or a said further port.

The controller may be configured to receive a user input, a measurement of a spool valve control signal and a measurement of speed of rotation of the rotatable shaft, to thereby determine (e.g. calculate), optionally with reference to a look-up table, an open-loop estimate of required displacement and typically also to determine (e.g. calculate) an estimate of flow on the basis of the measurement of speed of rotation of the rotatable shaft and the open-loop estimate of required displacement. Accordingly, the method may comprise receiving and processing a spool valve control signal (e.g. pilot pressure), responsive to a user input, and a measurement of speed of rotation of the rotatable shaft to thereby calculate (for example with reference to a look-up table) an open-loop estimate of required displacement and to calculate an estimated flow on the basis of the measurement of shaft speed and the open-loop estimate of required displacement.

Instead of the spool valve control signal, a feedback signal from the spool valves, for example spool position, may be used.

The method may comprise determining a value representative of a pressure drop across the spool valve on the basis of the control signal (and hence on the basis of spool valve openness), and measuring the actual drop in pressure (e.g. by receiving pressure measurements from pressure sensors at the hydraulic machine and at the actuator) and comparing the actual drop in pressure with a threshold drop in pressure and reducing the displacement if the actual drop in pressure exceeds the threshold pressure drop. The controller may be configured to determine a value representative of a pressure drop across the spool valve on the basis of the control signal (and hence on the basis of spool valve openness), and to measure the actual drop in pressure (e.g. by receiving pressure measurements from pressure sensors at the hydraulic machine and at the actuator) and to compare the actual drop in pressure with a threshold drop in pressure and to reduce the displacement if the actual drop in pressure exceeds the threshold pressure drop The power dissipated over the spool valve is a function of the flow through the spool valve and the pressure drop over the spool valve. The pressure drop over the spool valve is proportional to the square of the flow through the spool valve. Therefore, if the pressure drop is high, it indicates there is a lot of power being wasted through the spool. Accordingly, the threshold pressure drop for a given measured spool valve position or spool valve control signal is set depending on what is considered an acceptable power loss at a given spool position. Thus, when the pressure drop exceeds the threshold pressure drop, flow to one or more actuators can be reduced (e.g. limited) to thereby limit the loss in power. This has the effect of improving efficiency. In use, an operator may adjust the spool valve control signal (e.g. the pilot signal), typically via a joystick, to thereby increase the openness of the (e.g. spool valve) and hence to cause an increase in velocity at the one or more actuators. The pressure drop for a given flow through a larger (e.g. spool) valve opening is smaller.

Typically, the controller causes the flow to be reduced if the actual pressure drop exceeds the threshold pressure drop using a proportional-integral control loop. The method may comprise causing the flow to be reduced if the actual pressure drop exceeds the threshold pressure drop using a proportional-integral control loop. Such a proportional-integral control loop is configured such that the integral part of the control loop is only permitted to integrate when the actual pressure drop exceeds the threshold pressure drop or to return the integrated value to zero in the case that the actual pressure drop is lower than the acceptable pressure drop. The proportional part of the control loop is applied when the actual pressure drop does not exceed the acceptable pressure drop. Typically, the proportional part of the control loop is configured to cause substantially no change in flow if the actual pressure drop does not exceed the threshold pressure drop. Accordingly, the controller (i.e. via the integral-proportional control loop) typically only acts to reduce the flow (e.g. displacement), i.e. the proportional-integral control loop does not act to increase the flow. The method typically only includes reducing the flow.

It may be that, when the controller selectively restricts the displacement of the group of one or more working chambers to give less flow, the displacement is reduced to below (e.g. by a predetermined margin) the displacement indicated by the spool valve control signal (which in turn is typically determined by the position of a manually operable control) and/or to below (e.g. by a predetermined margin) the displacement that would be expected to give the measured pressure drop during normal operation. Thus, the controller may over-limit the displacement of the group of one or more working chambers. The method may comprise reducing the displacement to below (e.g. by a predetermined margin) the displacement indicated by the spool valve control signal (which in turn is typically determined by the position of a manually operable control) to below (e.g. by a predetermined margin) the displacement that would be expected to give the measured pressure drop during normal operation Thus the method may comprise over-limiting the displacement of the group of one or more working chambers.

This has the effect of urging the operator to move the manually operable control to a position which causes the spool valve to be more open and/or the one or more working chambers to displace more fluid. This has the advantage of allowing more efficient operation and prevents inefficiencies associated with proportional spool valves.

Where the displacement is regulated (e.g. increased, decreased or limited) this typically comprises (e.g. is achieved by) regulating (e.g. increasing, decreasing or limiting) the demand signal.

Resonant oscillations in vehicles have a number of negative effects, e.g. damage to components, unacceptable noise and vibration as experienced by the operator.

Vehicles comprising hydraulic transmissions can be damaged by resonant oscillations arising from the operation of a hydraulic machine within or connected to the hydraulic transmission, including resonant oscillations arising from the operation of the hydraulic transmission. However, it has been found that when employing hydraulic machines and motors of the type described above, vibrations may arise, resulting from the pulsatile nature of the flow through the hydraulic machine, which may lead to oscillations if they coincide with a resonant frequency of one or more components. Vibration of a component at its resonant frequency will only be caused if there is a mechanical transmission path from the source of the excitation to the component. Vibrations may arise which are dependent on the frequency with which active cycles are selected. For example, if ten active cycles are selected per second, spaced equally apart in time, vibrations may arise at 10 Hz. Similarly, problems may also arise from vibrations associated with the frequency of inactive cycles of working chamber volume. For example, if on every revolution of the shaft, all working chambers undertake an active cycle but one working chamber per 0.1 second carries out an inactive cycle, where inactive cycles are spaced equally apart in time, there may be a vibration of 10 Hz, as a result. Such vibrations can be more damaging, simply because they become relevant when the machine is operating at a high proportion of maximum displacement, and therefore in circumstances where there is a high-power throughput, and greater forces are acting.

Typically, operating a hydraulic machine within a vehicle (e.g. an excavator) will generate vibrations which may be categorised into three groups: unacceptable, undesirable, and acceptable vibrations. The controller may be configured to determine (and the method may comprise determining) whether the vibrations are categorised as unacceptable vibrations, undesirable vibrations or acceptable vibrations in dependence on factors comprising the magnitude of these vibrations and/or the frequency of these vibrations and/or is the presence of a mechanical transmission path for these vibrations to allow for other components to be excited. Where the demand is quantised the output pulsations of the hydraulic machine may contain a certain frequency content comprising frequencies that are not considered unacceptable or undesirable since they do not cause vibration as felt by the driver, or do not result in audible noise, or result in vibrations that could be expected to cause damage to components. However, the frequency content may cause pulsations in the pressure which we not wish to use when calculating the torque of the hydraulic machine. The frequency content of the pressure is known, and this can be removed by using a moving average filter. (In the instance that the window size is dynamically adjusted such that the moving average filter will remove this particular acceptable frequency, the filter will also remove the harmonics of that frequency, and since the moving average filter is a type of low pass filter it will also partially attenuate all frequencies above the acceptable frequency.

The demand signal is used by the hydraulic machine (e.g. by a hydraulic machine controller) to make decisions as to whether each working chamber of the group of one or more working chambers carries out an active cycle or an inactive cycle for each working chamber on each cycle of working chamber volume. Where the demand signal is calculated in response to a measured property of the hydraulic circuit or one or more actuators we have found that there may be unwanted vibrations or oscillations arising from frequencies of cylinder activation or inactivation resulting from the pattern of active and inactive cycles implemented by the hydraulic machine in response to the demand signal. This may occur for example if the measured property is the pressure or flow rate at a location in the hydraulic circuit in fluid communication with the group of one or more working chambers, and/or a position or speed of movement of one or more of the actuators in fluid communication with the group of one or more working chambers. It would be advantageous to suppress these frequencies from the feedback loop.

It may be that the demand signal to which the hydraulic machine responds is quantised, having one of a plurality of discrete values. It may be that a (optionally continuous) demand signal is received and is quantised, for example by selecting the discrete value closest to the received demand, or the next discrete value above or below the received demand. Hysteresis may be applied in the quantisation step, to avoid chatter. The plurality of discrete values may be representative of the average fraction of full displacement of fluid by the group of one or more working chambers). There may be a step of determining the discrete values, for example calculating them or reading them from memory, and they may be variable, for example depending on the speed of rotation of the rotatable shaft.

It may be that the controller is configured to calculate, and the method may comprise calculating, the demand signal by filtering a control signal based on the measured property of the hydraulic circuit or one or more actuators using a filter, wherein the filter attenuates one or more frequencies arising from a pattern of active and inactive cycles of working chamber volume resulting from the hydraulic machine selecting the net displacement of hydraulic fluid by each working chamber responsive to the demand signal. It may be that the said one or more filters comprise at least one moving average filter. It may be that the measured property of the hydraulic circuit is a measured pressure (e.g. at an output of the hydraulic machine, at one or more actuators, before or after one or more control valves etc.)

The filter may be varied in dependence on a current or previous value of the demand signal to thereby suppress frequencies arising from the pattern of working chambers undergoing active or inactive cycles arising from the (quantised) demand signal.

The plurality of discrete values of the demand signal may or may not be equally spaced. The discrete values may or may not vary with the speed of rotation of the rotatable shaft. If they vary with the speed of rotation of the rotatable shaft, they may be selected to reduce the generation of low frequency components. There may for example be less than 1000, or less than 100 discrete values. Where the demand signal is digital, we do not refer to the possible values imposed by binary logic but to a subset of the values which could be represented digitally given the bit size of the demand signal. Thus, the discrete values typically represent less than 10%, less than 1% or less than 0.1% of the digital values which the demand signal could have, given its bit length.

It may be that the values of the discrete values vary with speed of rotation of the rotatable shaft and are selected to avoid the generation of undesirable and/or unacceptable frequencies when the hydraulic machine controls the net displacement of the group of one or more working chambers to implement the quantised demand.

The moving average filter typically has a filter window. It may be that the filter window has a filter window length selected in dependence on the discrete value of the demand signal and the speed of rotation of the rotatable shaft to attenuate a frequency arising from the group of one or more working chambers carrying out active or inactive cycles of working chamber volume at that discrete value of the demand signal and that speed of rotation of the rotatable shaft. It might be that the filter window has a filter window length corresponding to an inverse value of a predetermined minimum frequency. Thus, the filter will remove components at the predetermined minimum frequency and typically also attenuate lower frequency components. Typically, the predetermined minimum frequency is proportional to speed of rotation of the rotatable shaft, for a given pattern of active and inactive cycles/given demand. The predetermined minimum frequency may be determined from a parameter stored in memory for a given discrete value of the demand signal and from the speed of rotation of the rotatable shaft.

Although the filter window length may be fixed, typically the hydraulic machine controller is configured to cause periodic adjustments of the filter window length in dependence on the demand signal. The method may comprise causing periodic adjustments of the filter window length in dependence on the demand signal, for example once per rotation of the rotatable shaft.

Moving average filters which take the average of a specified function over a specified number of previous data points (e.g. data in a given data window) are known. In calculating the average, different weighting may be assigned to different data points, or substantially the same weighting may be assigned to each data point (e.g. where the moving average is effectively a moving mean). Averages may be arithmetic, harmonic or geometrical mean, median, mode etc. Where a moving average filter has a fixed filter period (e.g. a data window of fixed size) the moving average filter is unlikely to effectively filter all unwanted frequencies. However, where the frequency waveform of a function contains a signal with a given frequency that has the same period as the size of the moving average window, that frequency is completely attenuated (i.e. filtered) from the function. It is therefore possible to remove any frequency by selecting the window size of a moving average filter such that it matches the period of that frequency. Since the moving average filter acts as a low pass filter, any frequencies above this said frequency will be at least partially attenuated. A further aspect of the invention provides a moving average filter with a dynamically changing window size.

Individual working chambers are selectable, e.g. by a valve control module, on each cycle of working chamber volume, to either displace a predetermined fixed volume of hydraulic fluid (an active cycle), or to undergo an inactive cycle (also referred to as an idle cycle) in which there is no net displacement of hydraulic fluid, thereby enabling the net fluid throughput of the machine to be matched dynamically to the demand indicated by the demand signal. The controller and/or the valve control module may be operable to cause individual working chambers to undergo active cycles or inactive cycles by executing an algorithm (e.g. for each cycle of working chamber volume). The method may comprise executing an algorithm to determine whether individual working chambers undergo active cycles or inactive cycles (e.g. for each cycle of working chamber volume). The algorithm typically processes the (e.g. quantised) demand signal.

The pattern of active and inactive cycles of working chamber volume carried out by the working chambers has a frequency spectrum with one or more intensity peaks. For example, if the working chambers carried out, on an alternating basis, active and inactive cycles, there would be an intensity peak at a frequency equal to half the frequency of cycles of working chamber volume. More generally, the working chambers will undergo a more complex pattern of active and inactive cycles, having a frequency spectrum with one or more intensity peaks.

The pattern of active and inactive cycles of working chamber volume carried out by the working chambers typically has a finite period, wherein the finite period may vary within a range of acceptable values. For example, the pattern of active and inactive cycles may have a minimum period of at least 0.001 s, or at least 0.005 s, or at least 0.01 s and/or may have a maximum period of at most 0.1 s, or at most 0.5 s.

In an example machine, the minimum period may be 2 ms (caused by the frequency of activation of all 12 cylinders at a maximum speed of 2050 RPM). One skilled in the art will appreciate that with higher speeds of the prime mover, or with more cylinders, the minimum period could be 1 ms (or lower). In a primary embodiment, it is preferable to remove all frequencies below 5 Hz, thus corresponding to a period of 0.2 s.

Typically, the range of acceptable periods is selected in dependence on the acceptable frequency content. From this maximum acceptable period an acceptable finite range of displacement demands will be selected dependent on the number of cylinders and on the operating range of the prime mover. For example, the range of acceptable Fd values may be selected to comprise of a finite number of integer fractions of the displacement demand. The denominators of the finite number of integer fractions may be selected in dependence on the rotational speed of the rotational shaft, for example, the denominators may be selected such that the period is lower than a maximum period. Typically, acceptable values of the denominators of the finite number of integer fractions vary in dependence on the rotational speed of rotation of the rotatable shaft. It is beneficial to have a short period because this corresponds to more frequent cycles of active or inactive working chamber volume and it therefore removes low frequency content from the chamber activations.

Typically, the window size of the moving average filter is selected in dependence on the frequency of the pattern of active and inactive cycles of working chamber volume. For example, if the pattern of active and inactive cycles of working chamber volume has a frequency of 10.5 Hz, the window size of the moving average filter may be selected such that it has a period of 0.095 s.

The frequency of working chambers carrying out active or inactive cycles is proportional to the speed of rotation of the rotatable shaft (revolutions per second). This is because there will typically be one point during each cycle of working chamber volume where a given working chamber is committed to either carry out an active cycle or an inactive cycle. For example, a decision is typically made whether or not to close an electronically controlled valve regulating the flow of hydraulic fluid between a working chamber and the low-pressure hydraulic fluid manifold. Thus, the (potentially undesirable) frequencies arising from a particular sequence of active and inactive cycles are proportional to the speed at which cycles take place, that is to say proportional to the speed of rotation of the rotatable shaft. Thus, the window size of the moving average filter is typically selected in dependence on the demand signal and on the speed of rotation of the rotatable shaft.

Nevertheless, there may be undesirable frequencies (e.g. range of frequencies) which comprise one or more resonant frequencies of a portion of a hydraulic machine and/or one or more resonant frequencies of a portion of the vehicle (e.g. the excavator), which is part of or in mechanical communication with (e.g. mechanically coupled to) the hydraulic machine, which resonant frequencies does not vary proportionately to the speed of rotation of the rotatable shaft.

It is the frequency with which the number of working chambers carrying out active (or inactive, as appropriate) cycles varies which is important. If the number of working chambers carrying out active (or inactive as appropriate) cycles was changed by a constant amount, that does not affect the fundamental frequency. For example, if at successive decision points (i.e. points in time at which decisions are made as to whether one or more working chambers should undergo active or inactive cycles), it is determined that a sequence of working chambers may be represented by 1's and 0's, where 0 represents an inactive chamber cycle and 1 represents an active chamber cycle, e.g.: 0, 0, 0, 1, 0, 0, 0, 1 (this sequence has the same fundamental frequency as the sequence 1, 1, 1, 0, 1, 1, 1, 0).

Accordingly, the invention recognises that the hydraulic machine will generate vibrations having intensity peaks at frequencies which depend on the pattern of active and inactive cycles carried out by the working chambers and which, for a given sequence of active and inactive cycles, is proportional to the speed of rotation of the rotatable shaft. According to the invention, the pattern of valve command signals is controlled to reduce unwanted vibrations by preventing certain ranges of Fds which means that the target net displacement is sometimes not met exactly. However, in closed loop feedback systems any errors arising from this can be corrected for. The pattern of valve command signals typically affects the frequency at which the one or more intensity peaks of the frequency spectrum occur, by determining whether each working chamber undergoes active or inactive cycles. However, if the amount of hydraulic fluid displaced by working chambers varies between cycles then the net displacement determined by the pattern of valve control signals during each cycle of working chamber volume also affects the frequency at which the one or more intensity peaks of the frequency spectrum occurs.

Where the demand signal is quantised, the patterns of active and inactive cycles at these discrete displacements ('quantised displacements') cause cylinder enabling patterns with known frequency content and, as such, the lowest frequency pattern of cylinder enabling patterns present is known. Accordingly, the method may comprise dynamically adjusting (and the controller may be configured to adjust) the window size of the moving average filter, such that the moving average filter totally attenuates the lowest known frequency. The method may comprise adjusting (and the controller may be configured to adjust) the window size of the moving average filter in dependence on the speed of rotation of the rotatable shaft and/or the current hydraulic fluid displacement. For example, if quantisation gives rise to a 10 ms period, the window size of the moving average filter may be selected to also have a 10 ms period to thereby attenuate e.g. filter) a 10 Hz cylinder enabling pattern.

It may be that the controller receives a demand signal (typically a continuous demand signal) and determines a corresponding series of values, said series of values corresponding to a pattern of active and/or inactive cycles of working chamber volume to thereby meet the demand signal (i.e. when the demand signal ($F_d$) resulting from the pattern of active and/or inactive cycles of working chamber volume is averaged over a time period). The method may comprise receiving a demand signal (typically a continuous demand signal) and determining a corresponding series of values, said series of values corresponding to a pattern of active and/or inactive cycles of working chamber volume to thereby meet the demand signal (i.e. when the demand signal ($F_d$) resulting from the pattern of active and/or inactive cycles of working chamber volume is averaged over a time period).

For example, the controller may receive a continuous demand signal for 90% of the maximum displacement and may determine a series of values comprising at least 100 values, or preferably at least 500 values, or more preferably at least 1000 values. The series of values may comprise a repeating sequence and hence the pattern of active and/or inactive cycles may comprise a period which corresponds to the repeating sequence.

The method may comprise selecting a minimum allowable frequency (e.g. 5 Hz, 10 Hz), and then creating a quantised list of the plurality of discrete values of the demand (e.g. Fd), said values (e.g. of Fd) selected to cause one or more patterns of cylinder activation, wherein said patterns only have frequency content above the minimum allowable frequency. The controller may be configured to determine a minimum allowable frequency (e.g. 5 Hz, 10 Hz), and then to create a quantised list of the plurality of discrete values of the demand (e.g. Fd), said values (e.g. of Fd) selected to cause one or more patterns of cylinder activation, wherein said patterns only have frequency content above the minimum allowable frequency.

The quantised list of allowable values of demand may be dependent on the number of cylinders in the machine and/or on the operational speed of rotation of the rotatable shafts of the machine (since the speed of rotation of the rotatable shaft and number of cylinders will affect the frequencies present for a given demand value.) For each value of demand in the list it is possible to calculate the minimum frequency present. As the machine is operating, the (filtered) demand signal is transmitted to the controller of the hydraulic machine. The method may comprise receiving a value representative of a demand (e.g. $F_d$) and a measured speed of rotation of the rotatable shaft and querying a lookup table (to thereby determine the lowest frequency present as a result of the patterns of active and inactive cycles of working chamber volume for the said demanded Fd), selecting a window size corresponding to the lowest frequency present, calculating a moving average (e.g. mean) of a measured control signal (e.g. pressure) (i.e. from measured pressures within the window) and thereby totally attenuating the lowest frequency present in the control signal (arising from the pattern of active or inactive cycles of working chamber volume). Since the moving average filter is a type of low-pass filter, other frequencies above the minimum frequency will also be partially attenuated.

Typically, the method comprises dynamically adjusting the selected window size. The controller may be configured to dynamically adjust the selected window size.

Typically, the window size is dependent on the lowest frequency present (which is in turn dependent on speed of rotation of the rotatable shaft). The window size may be synchronised (i.e. adjusted) once per revolution signal.

By dynamically adjusting the window size (typically to match the inverse of the lowest known frequency), the moving average filter can totally attenuate this frequency from the received control signal or demand signal. This has the advantage of improving prime mover speed and allowing a hydraulic machine to operate closer to the prime mover speed (or torque) limit for a greater percentage of the time during which it is in use.

It may be that one or more of the resonant frequencies (and/or ranges of undesirable frequencies) does not vary with the speed of rotation of the rotatable shaft. However, it may be that one or more of the resonant frequencies (and/or ranges of undesirable frequencies) vary with the speed of rotation of the rotatable shaft. One or more of the resonant frequencies (and/or ranges of undesirable frequencies) may vary dependent on a parameter, which may be independent of the speed of rotation of the rotatable shaft. For example, one or more said resonant frequencies (e.g. of the ram) may depend on the position of a ram or boom. The one or more parameters may be measured parameters measured by one or more sensors.

This method is useful for attenuating known frequencies from a hydraulic machine that is controlled to output quantised displacement. The low frequency pattern of continuous displacement may in some cases cause large window sizes (e.g. if the frequency is very low) and as such considerable control lag. Additionally, since the displacement is continuous (and not in fixed steps) the patterns of working chamber actuations do not reach a repeating pattern state.

It may be that at least one of the said filters receives a signal and outputs a signal, wherein the output signal does not change as a result of the input signal changing within a band. Typically, the input signal is the control signal (e.g. measured pressure, flow or actuator position or speed) or a signal derived therefrom. Typically, the output is the demand signal or is further processed to give the demand signal.

Contributions from individual working chamber actuations can cause pulsatile pressure ripple. As changes in pressure are used to allow decisions to be made (e.g. a decision to change Fd, etc) small changes in pressure caused by pulsatile pressure ripple could be misinterpreted as real, deliberate pressure changes, which could lead to a decision being made in error.

It may be that the output of the filter remains at a substantially constant value until the input value changes to be outside a predetermined rejection range ("deadband") of the output. It may be that the output of the filter makes a step change (e.g. to the current value of the input) when the input values changes to be outside the predetermined rejection range of the output.

This has the advantage that pulsatile pressure ripple (or variations in other measured variables used for feedback) do not influence the hydraulic machine torque control, but large changes in pressure (not ripple), or other controls signals, are accounted for.

The predetermined rejection range may be selected in response to an expected range of pressure pulsation. The predetermined rejection range may comprise a pressure range of at least 10 bar, at least 20 bar or at least 30 bar (e.g. 20 bar). One skilled in the art will appreciate that the predetermined rejection range is typically selected dependent on the specific hydraulic system in which it is intended to be used. However, the predetermined rejection range may optionally be adjustable, for example if the compliance and/or stiffness of the hydraulic system changes (e.g. when an accumulator is provided).

Engines and pumps take a finite time to respond to a change in demand. Pumps (e.g. ECMs) typically respond more quickly than engines can.

Accordingly, a further aspect of the invention provides an apparatus comprising a prime mover (e.g. an engine) and a plurality of hydraulic actuators, a hydraulic machine having a rotatable shaft in driven engagement with the prime mover and comprising a plurality of working chambers having a volume which varies cyclically with rotation of the rotatable shaft, a hydraulic circuit extending between a group of one or more working chambers of the hydraulic machine and one or more of the hydraulic actuators, each working chamber of the hydraulic machine comprising a low-pressure valve which regulates the flow of hydraulic fluid between the working chamber and a low-pressure manifold and a high-pressure valve which regulates the flow of hydraulic fluid between the working chamber and a high-pressure manifold, the hydraulic machine being configured to actively control at least the low-pressure valves of the group of one or more working chambers to select the net displacement of hydraulic fluid by each working chamber on each cycle of working chamber volume, and thereby the net displacement of hydraulic fluid by the group of one or more working chambers, responsive to a demand signal, the apparatus comprising a prime mover speed governor operable to regulate the prime mover speed responsive to a prime mover control signal, wherein the apparatus is configured to regulate the prime mover control signal by feedforward of a signal related to a torque demand.

The invention extends to a method of operating the apparatus comprising regulating the prime mover speed responsive to a prime mover control signal, wherein the prime mover control signal is regulated by feedforward of a signal related to a torque demand.

The torque demand is typically a torque demand of the hydraulic machine, although it may be a torque demand of another component, for example of a component which is driven by the hydraulic machine.

The method may comprise regulating the prime mover to a target speed responsive to an operator input (which typically sets the target speed). Typically, the prime mover speed governor regulates the prime mover to a target speed responsive to an operator input (which typically sets the target speed). The signal related to a torque demand may be the measured property of the hydraulic circuit or one or more actuators, or an operating input. The signal related to prime mover torque demand may be associated with a given pressure or flow. The signal related to prime mover torque demand may be a filtered signal. The prime mover speed governor may be a prime mover controller (e.g. comprising one or more processors which executed stored program code).

Typically, the prime mover control signal is regulated to cause the prime mover governor to increase the applied torque of the prime mover in response to an increase in the torque demand.

Typically, the method comprises regulating, and the apparatus is configured to regulate, the prime mover control signal to cause the prime mover governor to increase the applied torque of the prime mover and then to subsequently, after a delay period, (and optionally in dependence on a measured speed and/or pressure and/or Fd, etc), to regulate the demand signal to increase the displacement of working fluid and the torque exerted by the group of one or more working chambers. Typically this such that the increase in torque exerted by the one or more working chamber is applied concurrently with (e.g. at the same time as) the increase in torque of the prime mover.

The method may comprise calculating a hydraulic machine demand, causing the prime mover to increase torque in order to meet the demand, delaying the hydraulic machine torque demand until the point where the prime mover can meet the demand, and subsequently both the pump load and prime mover torque are applied at the same time causing no net torque on the shaft and thus maintaining prime mover speed. The apparatus may be configured to calculate a hydraulic machine demand and to cause the prime mover to increase torque in order to meet the demand, while delaying the hydraulic machine torque demand until the point where the prime mover can meet the demand, and subsequently both the pump load and prime mover torque are applied at the same time causing no net torque on the shaft and thus maintaining prime mover speed.

Where the prime mover is an engine this has the advantage of improving engine stability by avoiding engine droop.

DESCRIPTION OF THE DRAWINGS

An example embodiment of the present invention will now be illustrated with reference to the following Figures in which.

It should be recognised that hydraulic circuit schematics for practical designs of both mobile and static hydraulic equipment, especially heavy construction equipment, are notoriously complex. For simplicity and clarity, the figures omit features which one skilled in the art will appreciate may be present, such as commonplace pressure relief valves, drain lines, flow control, hydraulic load holding, hydraulic load cushioning, accumulators, compliant fluid volumes, among other aspects.

DETAILED DESCRIPTION OF AN EXAMPLE EMBODIMENT

A series of example embodiments will now be described wherein the prime mover is an engine. One skilled in the art will appreciate that other prime movers may also be chosen as appropriate.

Figure 1:
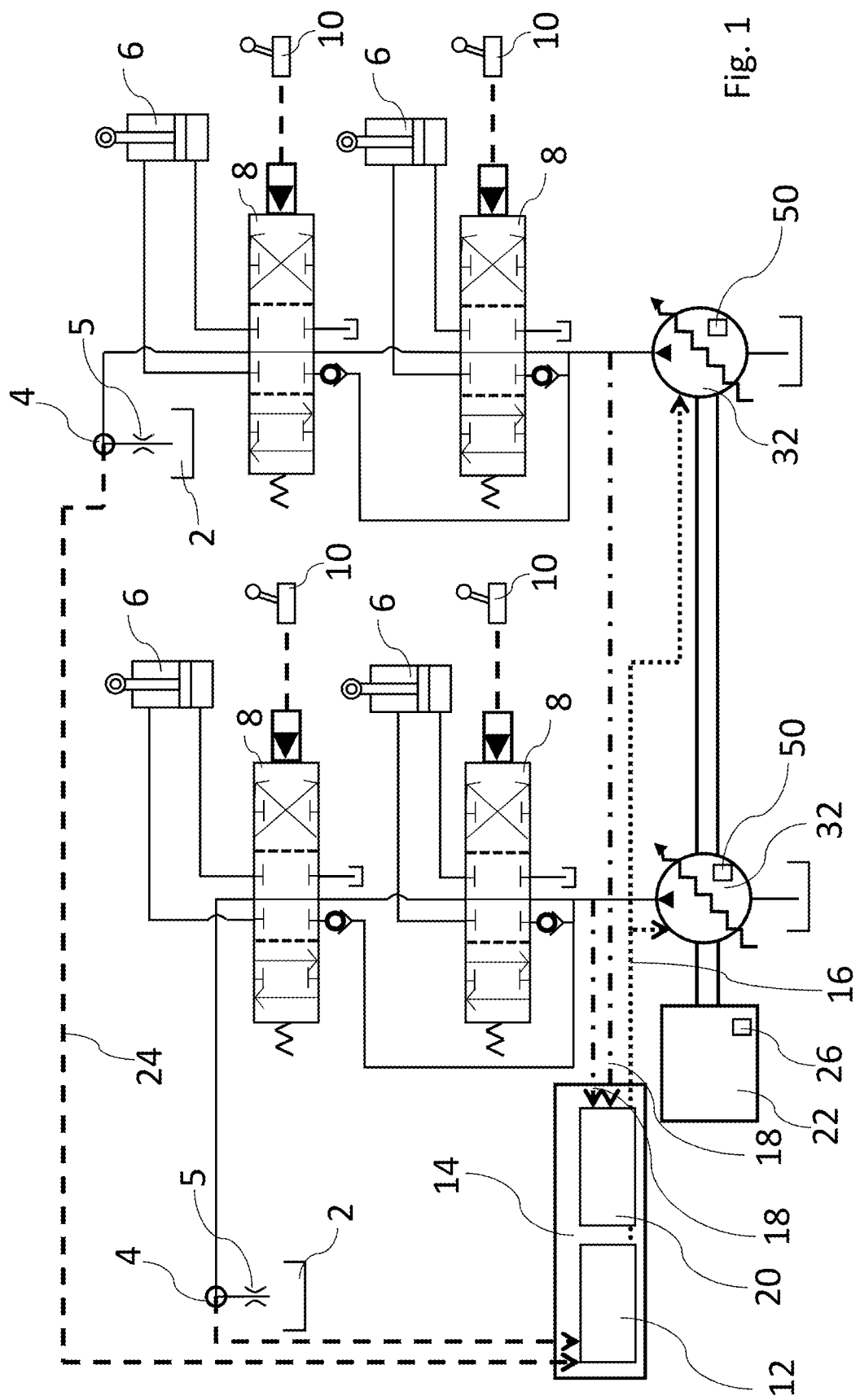
FIG. 1 is a diagram of an excavator hydraulic circuit with negative feedback control, featuring an ECM.

With reference to FIG. 1, a first example embodiment of the invention is a vehicle in the form of an excavator. Known excavators typically have fluid manifolds which extend through a central passage in valve 8 to a fluid container 2 (usually a tank at atmospheric pressure) through a throttle 5. Such excavators typically further have at least one pressure monitor 4, an engine 22 (in this example, a diesel engine having an engine controller 26), which functions as the prime mover, a controller 14 and a number of user input means (in this example, joysticks 10). The user input means typically being situated in an operator cabin and coupled to the open-centre spool valves 8 through which the fluid manifold extends. The actuators 6 (e.g. actuators for a boom ram, swing motor, track motors, etc) can be hydraulically connected to the pump outlet when their respective valves 8 are activated via joysticks 10.

Figure 2:
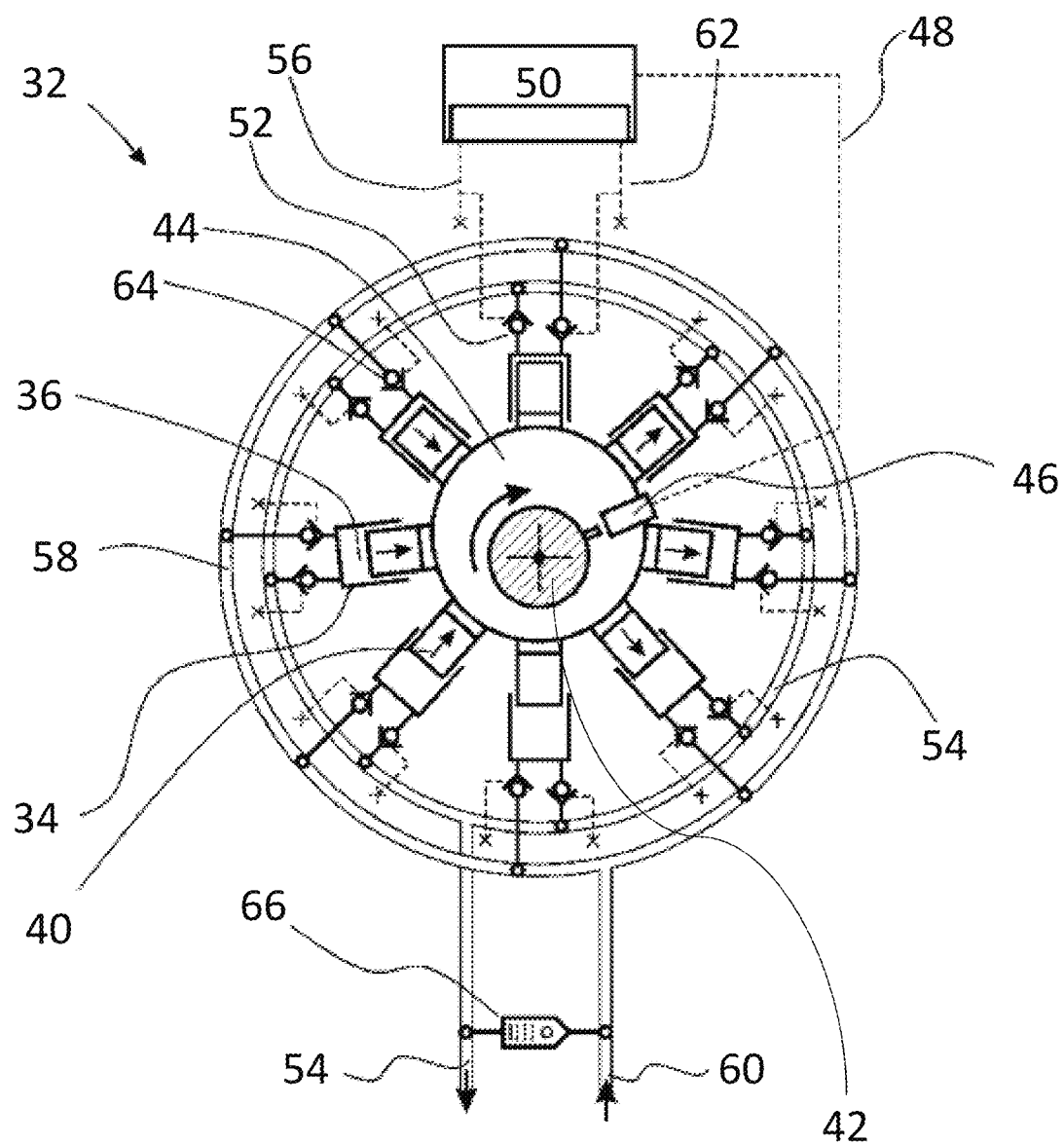
FIG. 2 is a schematic diagram of an ECM according to the invention.

In the first example embodiment of the invention the machine further has (e.g. at least) two electronically commutated hydraulic machines 32 of the type generally shown in FIG. 2, in rotational mechanical communication with the engine 22 to transfer torque through one or more rotational shafts.

FIG. 2 is a schematic diagram of a hydraulic machine 32 in the form of an electronically commutated hydraulic machine (ECM) comprising a plurality of working chambers having cylinders 34 which have working volumes 36 defined by the interior surfaces of the cylinders and pistons 40 which are driven from a rotatable shaft 42 by an eccentric cam 44 and which reciprocate within the cylinders to cyclically vary the working volume of the cylinders. The rotatable shaft is firmly connected to and rotates with a drive shaft. A shaft position and speed sensor 46 determines the instantaneous angular position and speed of rotation of the shaft, and through a signal line 48 informs the machine controller 14 of the machine, which enables the machine controller to determine the instantaneous phase of the cycles of each cylinder.

The working chambers are each associated with Low Pressure Valves (LPVs) in the form of electronically actuated face-sealing poppet valves 52, which have an associated working chamber and are operable to selectively seal off a channel extending from the working chamber to a low-pressure hydraulic fluid manifold 54, which may connect one or several working chambers, or indeed all as is shown here, to the low-pressure hydraulic fluid manifold of the ECM 54. The LPVs are normally open solenoid actuated valves which open passively when the pressure within the working chamber is less than or equal to the pressure within the low-pressure hydraulic fluid manifold, i.e. during an intake stroke, to bring the working chamber into fluid communication with the low-pressure hydraulic fluid manifold but are selectively closable under the active control of the controller via LPV control lines 56 to bring the working chamber out of fluid communication with the low-pressure hydraulic fluid manifold. The valves may alternatively be normally closed valves.

The working chambers are each further associated with a respective High-Pressure Valve (HPV) 64 each in the form of a pressure actuated delivery valve. The HPVs open outwards from their respective working chambers and are each operable to seal off a respective channel extending from the working chamber to a high-pressure hydraulic fluid manifold 58, which may connect one or several working chambers, or indeed all as is shown in FIG. 2, to the high-pressure hydraulic fluid manifold 60. The HPVs function as normally-closed pressure-opening check valves which open passively when the pressure within the working chamber exceeds the pressure within the high-pressure hydraulic fluid manifold. The HPVs also function as normally-closed solenoid actuated check valves which the controller may selectively hold open via HPV control lines 62 once that HPV is opened by pressure within the associated working chamber. Typically, the HPV is not openable by the controller against pressure in the high-pressure hydraulic fluid manifold. The HPV may additionally be openable under the control of the controller when there is pressure in the high-pressure hydraulic fluid manifold but not in the working chamber, or may be partially openable.

In a pumping mode, the controller selects the net rate of displacement of hydraulic fluid from the working chamber to the high-pressure hydraulic fluid manifold by the hydraulic motor by actively closing one or more of the LPVs typically near the point of maximum volume in the associated working chamber's cycle, closing the path to the low-pressure hydraulic fluid manifold and thereby directing hydraulic fluid out through the associated HPV on the subsequent contraction stroke (but does not actively hold open the HPV). The controller selects the number and sequence of LPV closures and HPV openings to produce a flow or create a shaft torque or power to satisfy a selected net rate of displacement.

In a motoring mode of operation, the hydraulic machine controller selects the net rate of displacement of hydraulic fluid, displaced by the hydraulic machine, via the high-pressure hydraulic fluid manifold, actively closing one or more of the LPVs shortly before the point of minimum volume in the associated working chamber's cycle, closing the path to the low-pressure hydraulic fluid manifold which causes the hydraulic fluid in the working chamber to be compressed by the remainder of the contraction stroke. The associated HPV opens when the pressure across it equalises and a small amount of hydraulic fluid is directed out through the associated HPV, which is held open by the hydraulic machine controller. The controller then actively holds open the associated HPV, typically until near the maximum volume in the associated working chamber's cycle, admitting hydraulic fluid from the high-pressure hydraulic fluid manifold to the working chamber and applying a torque to the rotatable shaft.

As well as determining whether or not to close or hold open the LPVs on a cycle by cycle basis, the controller is operable to vary the precise phasing of the closure of the HPVs with respect to the varying working chamber volume and thereby to select the net rate of displacement of hydraulic fluid from the high-pressure to the low-pressure hydraulic fluid manifold or vice versa.

Arrows on the ports 54, 60 indicate hydraulic fluid flow in the motoring mode; in the pumping mode the flow is reversed. A pressure relief valve 66 may protect the hydraulic machine from damage.

Returning to FIG. 1, each joystick 10 is coupled to an open-centre spool valve 8 to regulate flow therethrough. The pressure monitor 4 measures the pressure 24 of hydraulic fluid in the conduit in a position upstream of the throttle (i.e. in a position downstream of the group of hydraulic actuators). The controller 14 regulates the displacement of hydraulic fluid by a group of working chambers defined by cylinders in which pistons reciprocate in use (the working chambers being in fluid communication with the group of hydraulic actuators 6) in response to the measured pressure 24. This can be done in a feedback loop (e.g. if the pressure monitor 4 records a pressure that is below a desired level, the controller 14 can increase the displacement of hydraulic fluid and thus the pressure 24 will increase). In some excavators, the controller 14 may also take into account a flow demand 16 and a hydraulic machine outlet pressure 18 and may include a torque control module 20 and a negative flow control module 12.

The two ECMs 32 are each controlled by an ECM controller 50 such that cycle by cycle decisions can be made regarding whether or not an ECM will displace hydraulic fluid. Each ECM can transmit hydraulic fluid through a fluid manifold and through two open-centre spool valves 8 and to a tank 2 at atmospheric pressure. Each open-centre spool valve is in electronic communication with a joystick 10 via which a user may input a command. The spool valves have normally open centres, operable to close when a command is input via a joystick, in which case hydraulic fluid is diverted to a hydraulic actuator 6 (here shown as a single hydraulic actuator although it will be appreciated that it would be possible to divert hydraulic fluid to multiple hydraulic actuators) to thereby meet a demand. Pressure sensors 4 detect the pressure of hydraulic fluid between each ECM 32 and the tank 2. Although two open-centre spool valves are shown connected to each of the two machines 32, it will be appreciated that this number may vary upwards or downwards and may differ between the two electronically commutated machines.

Oil, functioning as a hydraulic fluid, is supplied from a tank to the input side of the hydraulic machine through a low-pressure fluid working manifold. The pressure in the high-pressure manifold is sensed using a pressure sensor.

The excavator also has an engine controller 22 and a system controller 14. The system controller controls the ECM by sending control signals (e.g. displacement demand signals 16) to the machine controller in order to regulate the displacement. The control signals demand displacement by the ECM, expressed as a fraction of maximum displacement, $F_d$, (the displacement demand). The absolute volume of the displacement (volume of hydraulic fluid displaced per second) is the product of the fraction of maximum displacement, the maximum volume which can be displaced per cycle of a working chamber, the number of working chambers and the rate of cycles of working chamber volume. Hence, the hydraulic machine controller can regulate the torque applied and the pressure in the high-pressure hydraulic fluid manifold. The pressure in the high-pressure hydraulic fluid manifold increases when the rate of displacement of hydraulic fluid increases faster than the hydraulic fluid is supplied to a hydraulic actuator and vice versa. Multiple hydraulic actuators may be in fluid communication with the high-pressure fluid manifold. The displacement of each ECM is taken into account by the hydraulic machine controller in regulating the torque.

The controllers 50 of the ECMs 32 are operable to make cycle-by-cycle decisions regarding whether each cylinder of the machine should complete an active or an inactive cycle. These decisions are made on the basis of a hydraulic fluid displacement demand associated with a given hydraulic actuator (or a combination of hydraulic actuators). Accordingly, there is a high frequency of decisions during the operation of such an ECM, and a correspondingly short response time of the machine when a hydraulic fluid displacement demand is applied or changed.

Figure 4:
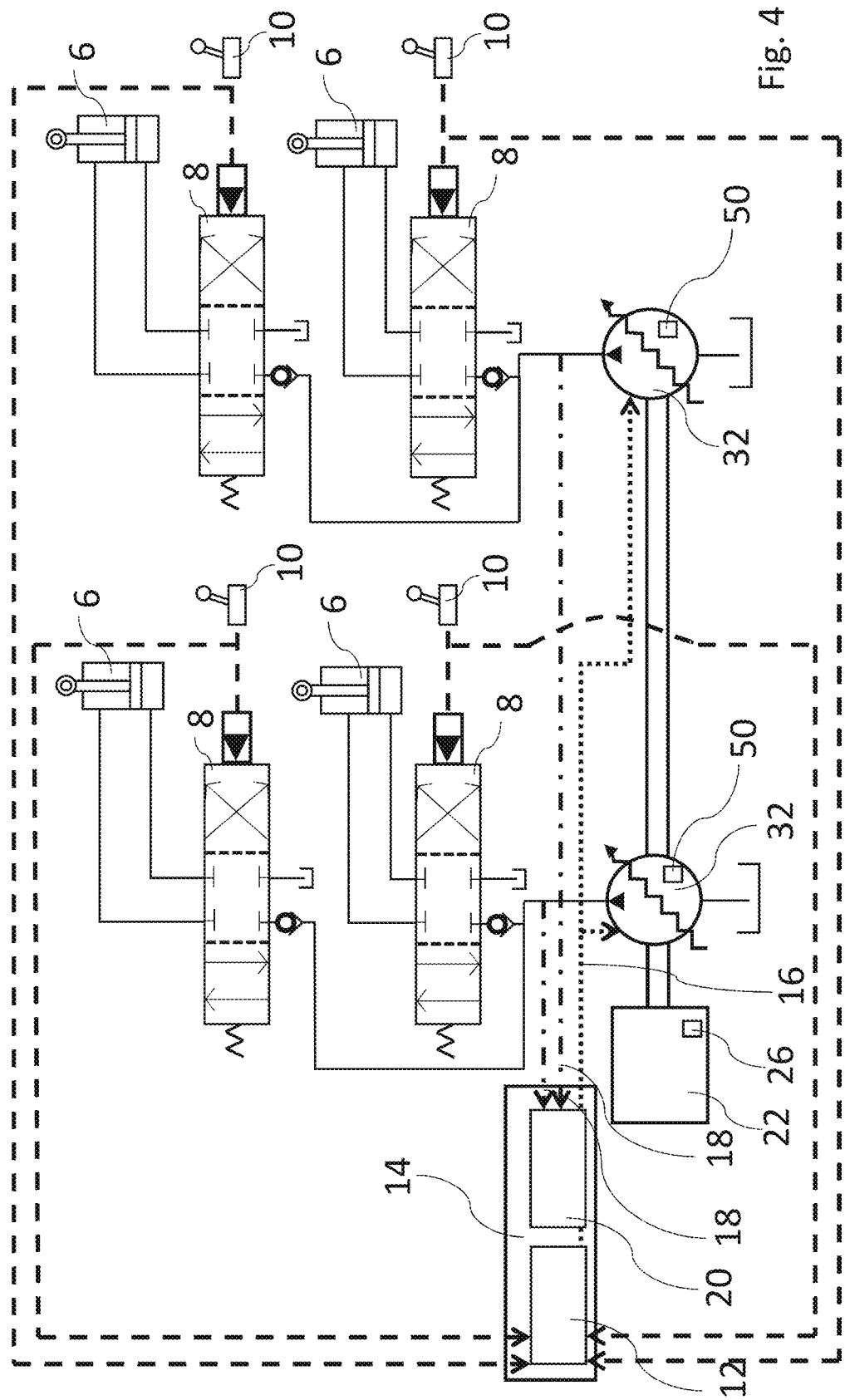
FIG. 4 is a diagram of an excavator hydraulic circuit with feedforward control, featuring an ECM.

With reference to FIG. 4, in an alternative example of an excavator, each joystick 10 is (in addition to being coupled to an open centre spool valve 8) in electronic communication with the system controller 14. This example excavator may, as a result, be operated without the feedback loop indicated in FIG. 1, in which case the system controller receives signals from the joysticks indicative of a demand and increase or decrease the displacement of hydraulic fluid in response to that demand.

Figure 5:
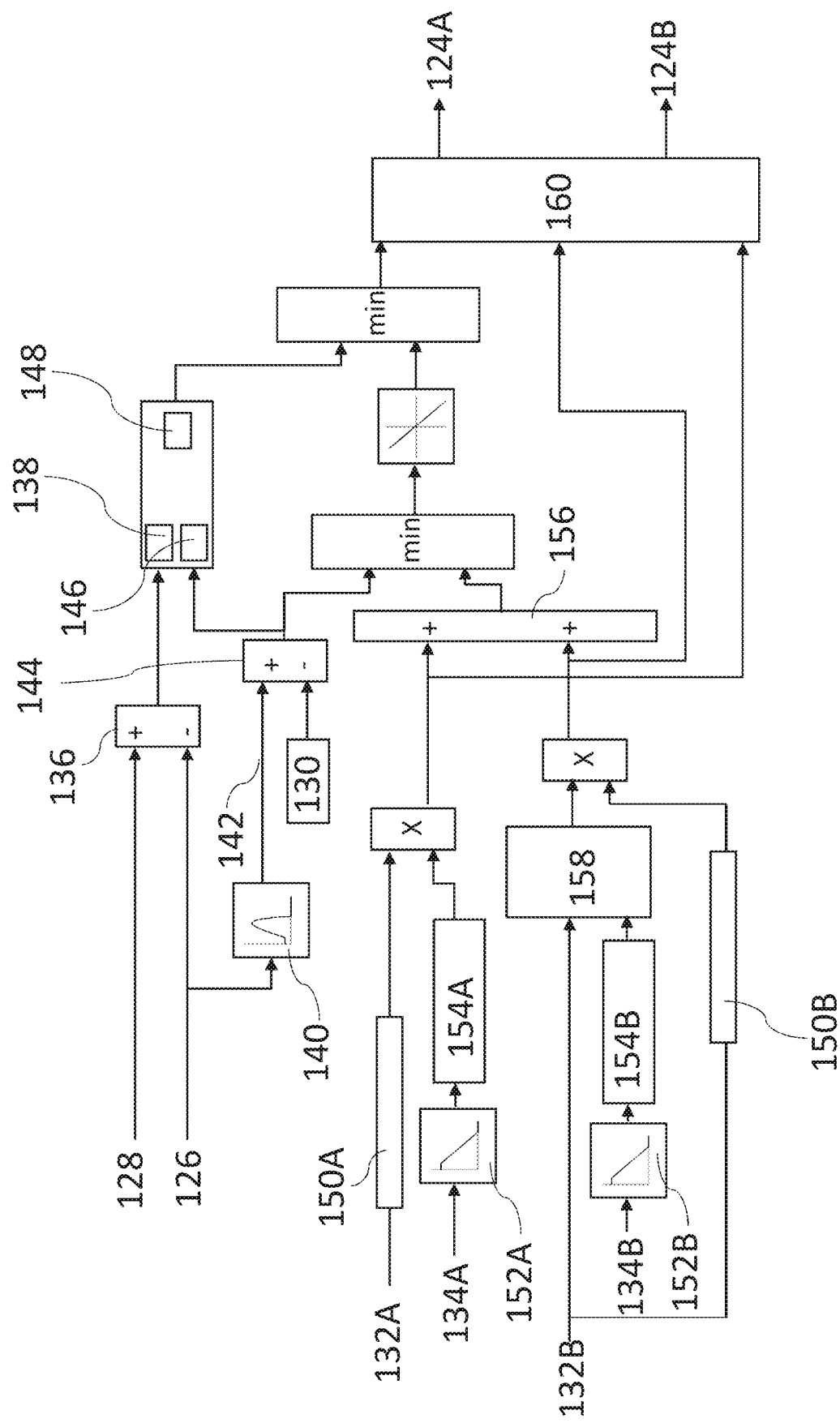
FIG. 5 is a logic diagram of inputs supplied to an excavator.

With reference to FIG. 5, for an ECM such as that of FIG. 2, decisions are made regarding pump displacement 124A, 124B (for each electronically commutated hydraulic machine) on the basis of several inputs including (although not necessarily limited to) an engine speed setpoint 126, a current engine speed 128, an engine torque safety factor 130, an output pressure of each hydraulic machine 132A, 132B and a negative flow control system pressure associated with each hydraulic machine 134A, 134B.

By subtracting an engine speed setpoint from a current engine speed 136, an engine speed error 138 is calculated. The engine speed setpoint 126 is further supplied to a look-up table 140 to thereby calculate the maximum engine torque 142 available and this is compared 144 to an engine torque safety factor 130 to calculate a maximum ECM torque 146 that can be applied to cause an acceptable level of engine droop.

The output pressure of each hydraulic machine is filtered 150A, 150B to remove the lowest frequencies arising due to quantisation and the negative flow control pressure is fed into a further look-up table 152A, 152B to thereby calculate a maximum flow displacement 154A, 154B. One of the filtered output pressures is also limited 158. The maximum flow displacement for each hydraulic machine is summed 156, and a corresponding torque is calculated. The difference between the current engine speed and the speed setpoint is determined, a gain is applied and a torque offset is applied to the maximum allowable ECM torque. This torque limit is compared to the maximum engine torque output 148 and the ECM torque demand is limited to this value (to ensure that excessive engine droop and stall can be avoided) before the torque demand signal is sent to the hydraulic machine controller. In response to the torque demand signal, the hydraulic machine controller makes a decision 160 on a cycle-by-cycle basis about whether or not each hydraulic machine should complete an active cycle or an inactive cycle. Depending on the present conditions (including the engine speed setpoint, current engine speed, engine torque safety factor, output pressure and negative flow control pressure and/or other factors) the hydraulic machine controller may cause the first hydraulic machine to undergo an active cycle while the second hydraulic machine undergoes an inactive cycle, or it may cause the first hydraulic machine to undergo an inactive cycle while the second hydraulic machine undergoes an active cycle, or it may cause both the first hydraulic machine and the second hydraulic machine to undergo an active cycle, or it may cause both the first hydraulic machine and the second hydraulic machine to undergo an inactive cycle.

Figure 6:
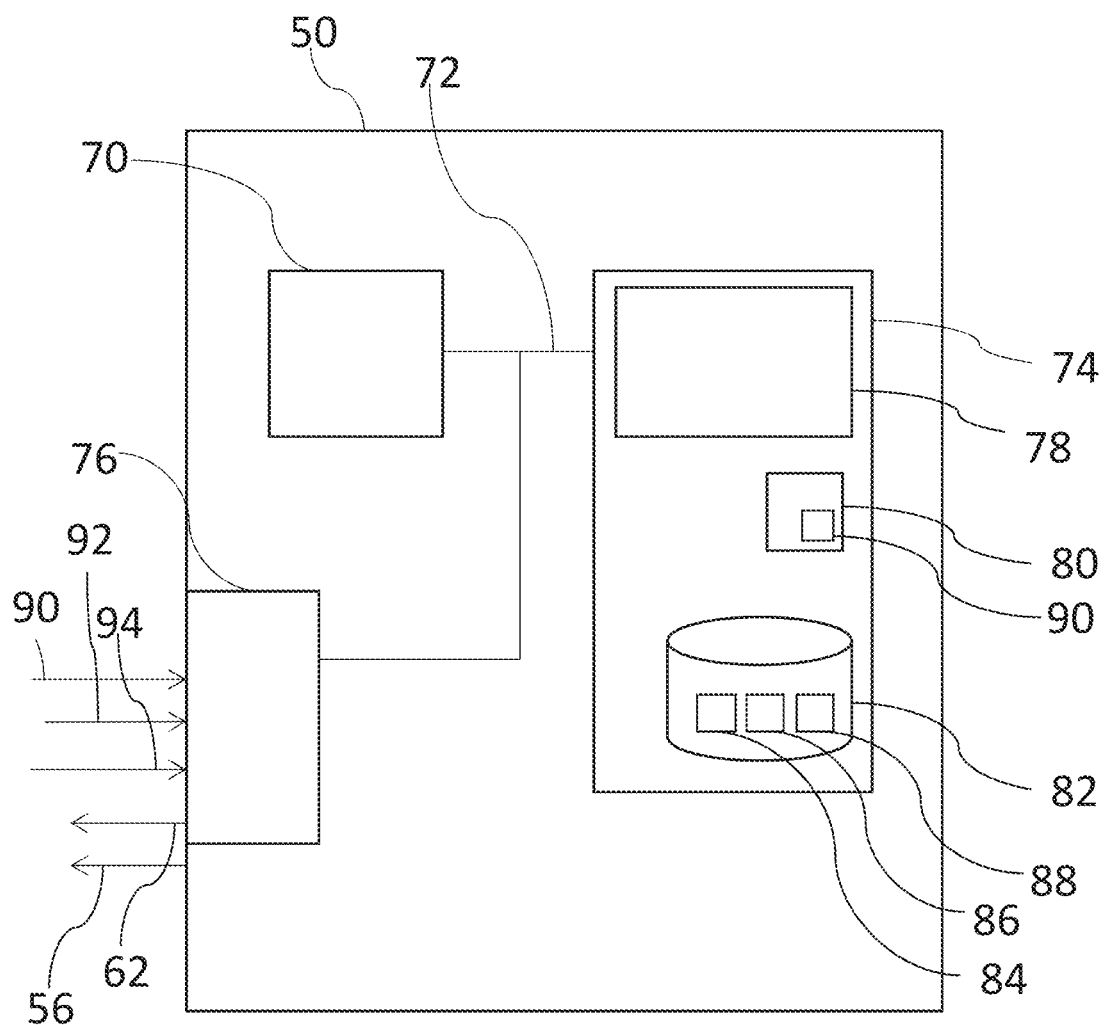
FIG. 6 is a schematic diagram of the valve control module of the hydraulic motor.

FIG. 6 is a schematic diagram of the machine controller 50 of the motor 32. A processor 70, such as a microprocessor or microcontroller, is in electronic communication through a bus 72 with memory 74 and an input-output port 76. The memory 74 stores a program 78 which implements execution of a displacement determination algorithm to determine the net volume of hydraulic fluid to be displaced by each working chamber on each cycle of working chamber volume, as well as one or more variables 80 which store an accumulated displacement error value. The memory also stores a database 82 which stores data concerning each working chamber, such as the angular position of each working chamber 84 and whether or not it is deactivated 86 (for example, because it is broken). The database may store the number of times each working chamber has undergone an active cycle 88. The database may store one or more look-up tables. The program may comprise program code 90, functioning as the resonance determining module, which calculates one or more undesirable frequencies and/or ranges of undesirable frequencies.

The controller receives input signals including a displacement demand signal 94, a shaft position (i.e. orientation) signal 90, and typically a measurement of the pressure 92 in the high-pressure manifold. It may also receive a speed signal, as well as control signals (such as commands to start up or stop, or to increase or decrease high-pressure fluid manifold pressure in advance or stating up or stopping), or other data as required.

Figure 7:
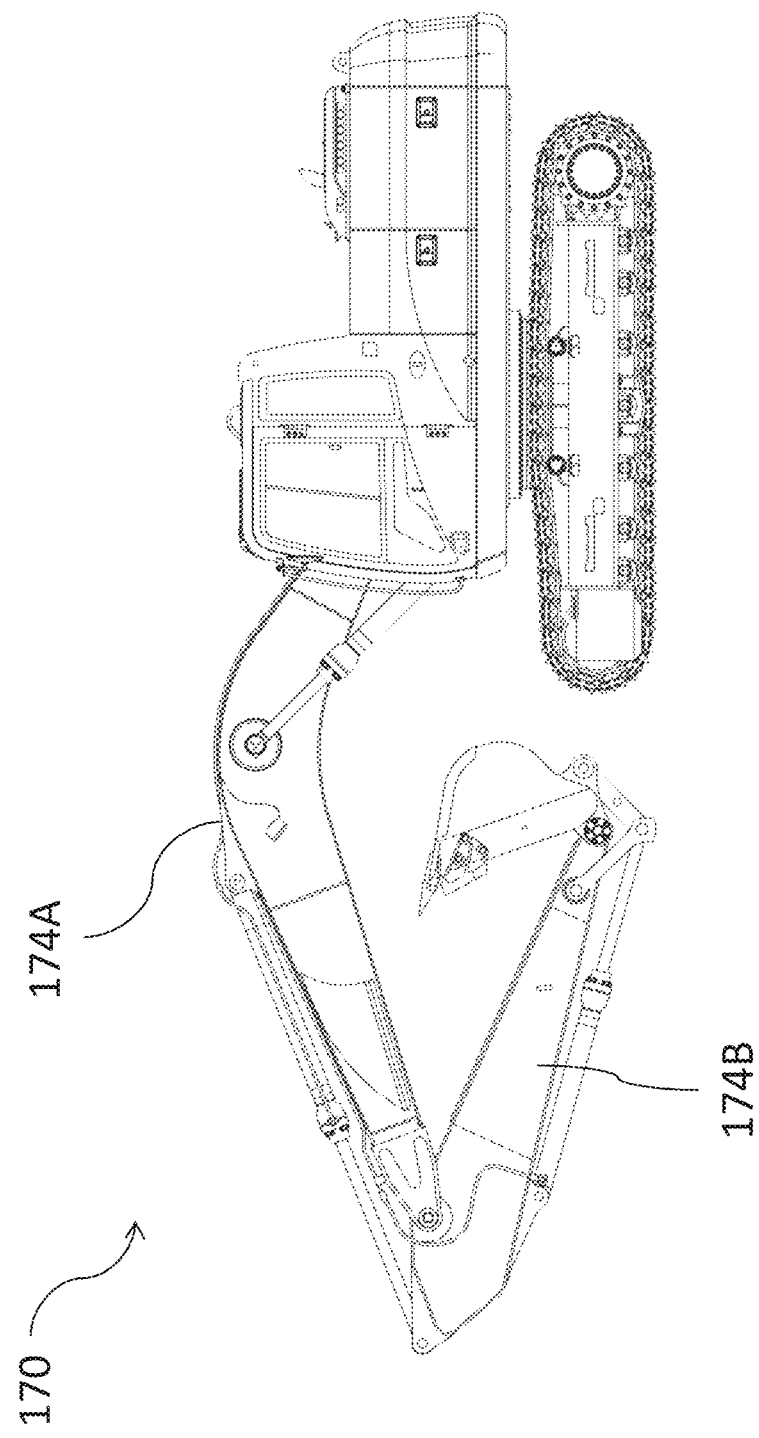
FIG. 7 is a schematic diagram of a hydraulic excavator.

FIG. 7 is a schematic diagram of an example embodiment of a vehicle 170, in this case an excavator with a hydraulically actuated arm. The hydraulically actuated arm is formed of a first jointed portion 174A and a second jointed portion 174B. Each of the first and second jointed portions can be independently actuated. Other example embodiments of suitable vehicles include telehandlers, backhoe loaders, etc.

Figure 3A:
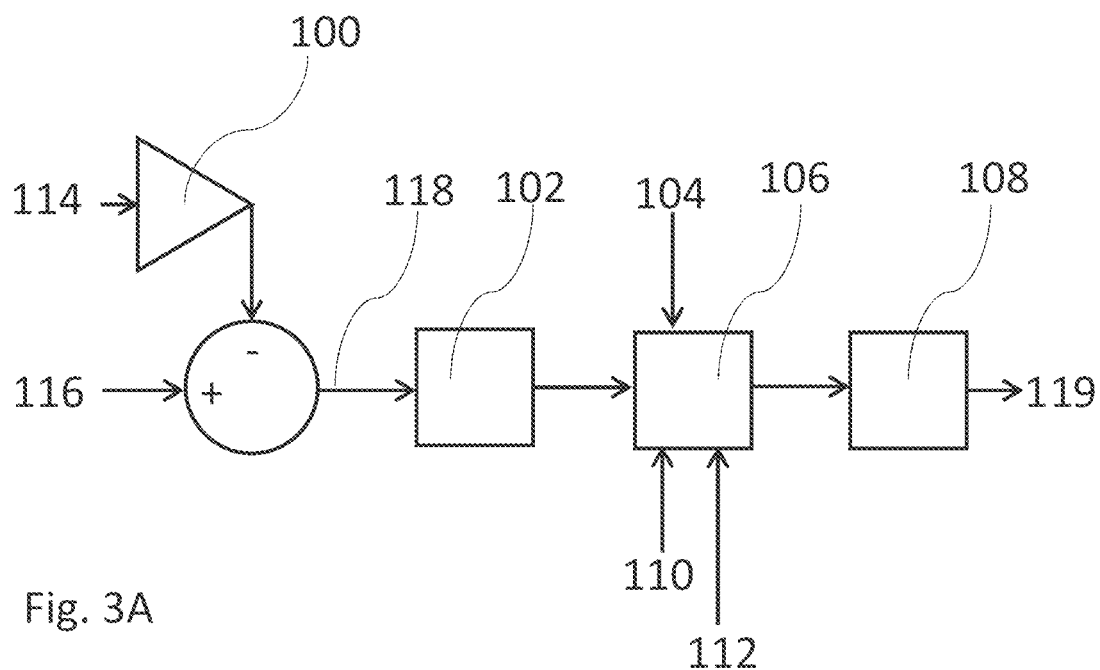
FIG. 3A is a flow chart showing a changing response time for an ECM.

FIG. 3A is a flow chart of a system according to the invention, wherein the system takes in an initial value of pressure 114 into the negative flow control system 100, the output of which is compared to a maximum pressure 116 giving a value of $F_d$ 118 which is fed to a low pass filter 102 (in this case a low pass filer with a 300 ms time constant). The output of this filter is passed to a speed limiter 106 which also takes in a pressure measurement 104, a current engine speed measurement 110 and an engine speed setpoint 112. This allows the calculation of a torque limit by a torque limiter 108 and hence a final output demand is passed to the electronically commutated machine(s) 119. Hence the present invention provides the function of emulating the behaviour of an analogue pump (e.g. a conventional swash plate pump).

Electronically commutated machines typically have very short response times. This is because decisions as to whether a working chamber will undergo an active cycle or an inactive cycle can be made for each working chamber on each cycle of working chamber volume. Working chambers are typically distributed around the rotating shaft and so there are multiple decision points (e.g. 8 or more or 12 or more) per rotation of the rotatable shaft. An electronically commutated machine rotating at 1500 rpm with working chambers spaced 24° apart around the rotatable shaft can react to a change in demand within 2.7 ms, for example. This very rapid response time can be preferable in some cases but can sometimes cause undesirable instabilities in the system which can have a negative impact on controllability.

For example, where a system is provided with a high gain proportionally with low compliance, the system will be sensitive to delays (for example, delays caused by the time needed to carry out a signal measurement (caused by filtering) or delays caused by hardware response times). Where such a system is sensitive to delays of 2-3 ms, reducing such delays to an acceptable level can be impracticable. Accordingly, the invention provides a method by which the output response is delayed in order to provide time for the system to become stable. A low pass filter (for example with approximately 100-300 ms) is used to filter the output demand. As a result, the time the system takes to respond to a step input is longer, however in practice, in many applications this is not noticeable to an operator (e.g. a user of an excavator) in use.

Figure 3B:
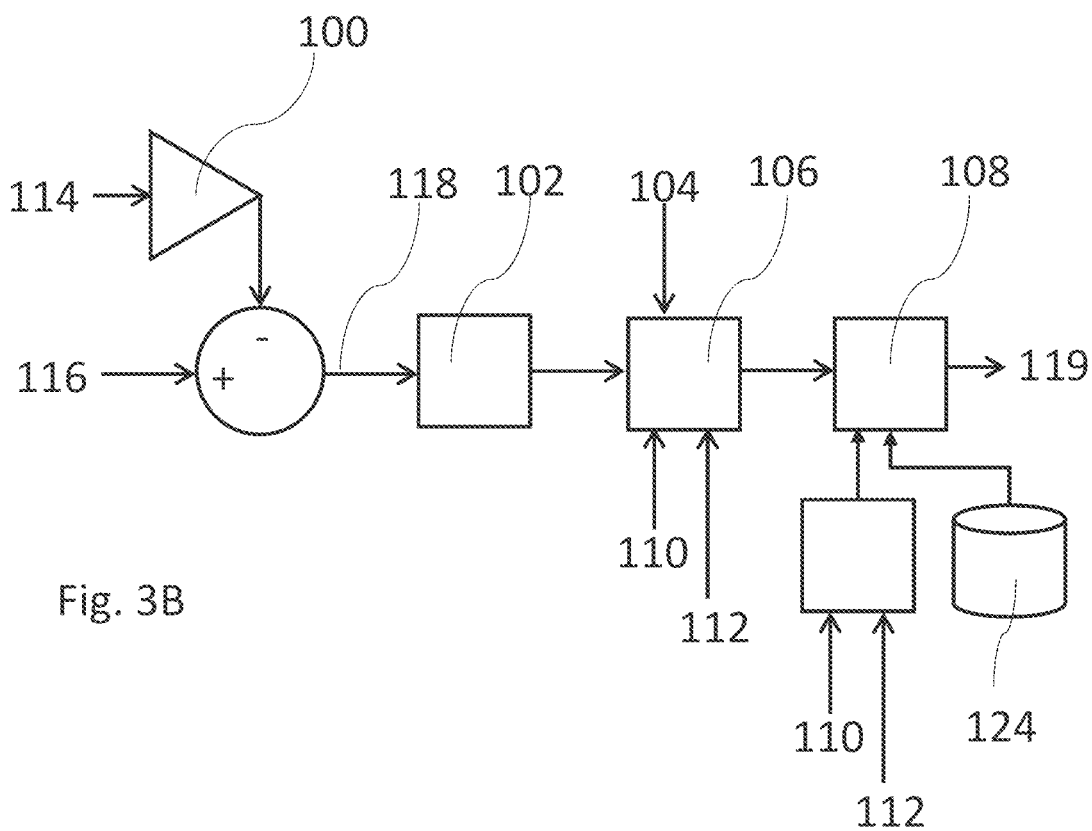
FIG. 3B is a flow chart showing a changing response time for an ECM.

FIG. 3B is a flow chart of a system with the features of 3A and further inputs of engine speed as currently measured 110 and an engine speed setpoint 112. These are compared to calculate an engine speed error. Additionally, a database 124 is provided, the database containing a look-up table which indicates an engine torque limit dependent on engine speed.

Figure 9:
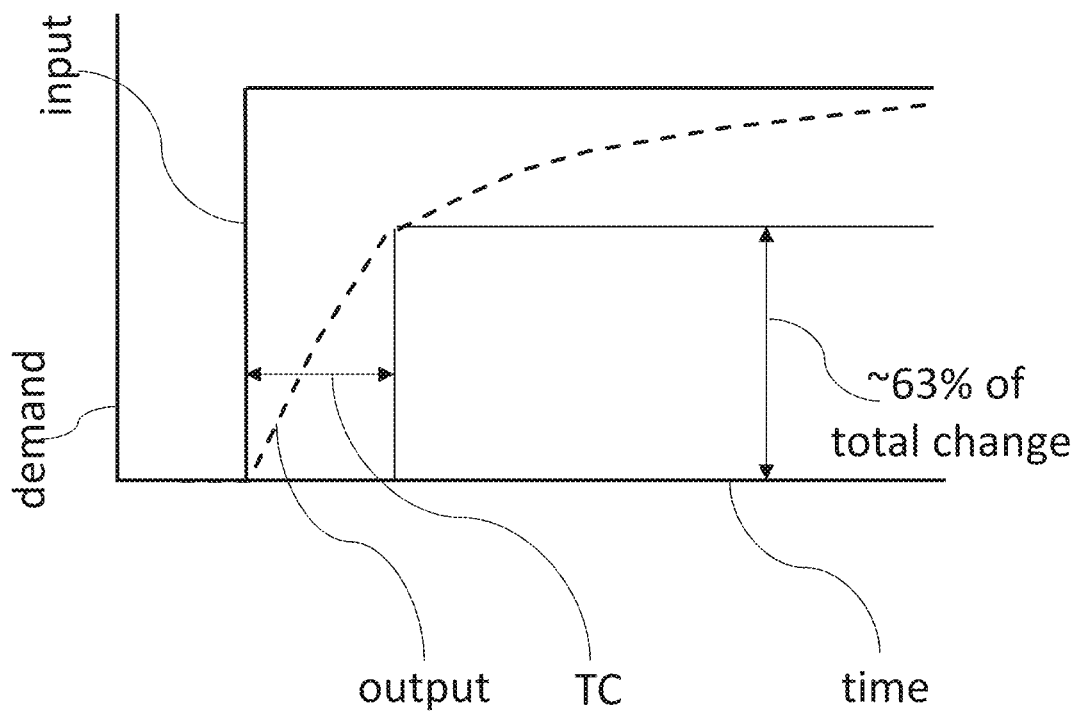
FIG. 9 is a plot of input and output overtime in response to a step demand, indicating the time constant of the system.
Figure 10:
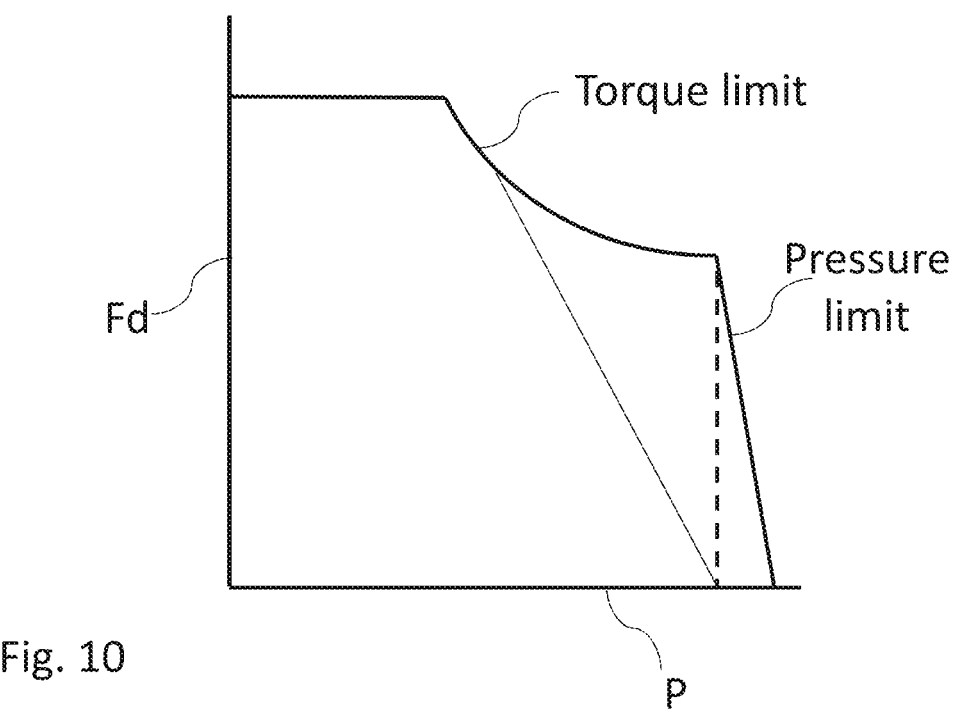
FIG. 10 is a plot of an example torque limit curve in dependence on pressure.

FIG. 9 is a plot indicating how a time constant is typically calculated (and defined) in the art. When a step demand is inputted into a system the system typically takes some finite time to respond to the demand. The time constant is defined as the time it takes for the output of the system to reach ~63% (i.e. 1-1/e) of the total change required by the input.

Because ECMs can react quickly (in that decisions are made on a cycle-by-cycle basis for each cycle of each working chamber and optionally independently of each cycle of each other working chamber) negative flow control systems operating with ECMs can become unstable in response to rapidly changing demands. In order to prevent this, the invention applies a response damper (in this example, in the form of a filter). This response damper introduces a 300 ms delay to the response time of the ECM. One skilled in the art will appreciate that any delay time may be selected in order to meet requirements of particular machines.

In addition, the invention also provides an override mode which bypasses the response damper to prevent the engine from stalling and to prevent engine droop.

The ECU controls the engine speed such that the engine speed is as close as possible to an engine speed set point, responding to changes in torque demand. When an increased demand is applied to the engine there is typically a reduction in engine speed (i.e. engine droop) and the ability to recover engine speed after such an increase in demand is dependent (at least) on the engine speed set point, the ECU response time and the fuel system.

During operation, the ECU receives a signal indicative of a desired value of torque or speed from an external sensor, for example an external sensor configured to measure the position of a pedal, or via a signal provided by a CANbus. The ECU receives signals from a rotational-speed sensor and calculates a speed of rotation of the rotatable shaft. The ECU is therefore operable to maintain the speed of rotation of the rotatable shaft to meet a desired speed demand through closed-loop control.

The ECU is also configured to control fuel-injection components of the engine through the control of one or more hydraulic machines, injectors, and/or nozzles in response to one or more received signals, including a signal indicative of a crankshaft position, a fuel temperature, a fuel pressure, and/or a mass-air-flow, to thereby meet a desired torque demand.

In embodiments where the engine has one or more turbochargers (or, for example, superchargers and/or exhaust gas-recirculators), The ECU is configured to monitor one or more received signals indicative of the mass-air-flow and/or air-charge pressure and to regulate air flow supplied to the cylinders in response to thereby meet a desired torque demand.

In addition, the ECU is configured to receive signals from and supply signals to additional systems including a traction control system (in some embodiments a transmission-shift control system). The ECU receives signals from and supplies signals to the additional systems via a CANbus and may modify the behaviour of the vehicle and/or the engine in response.

Figure 8A:
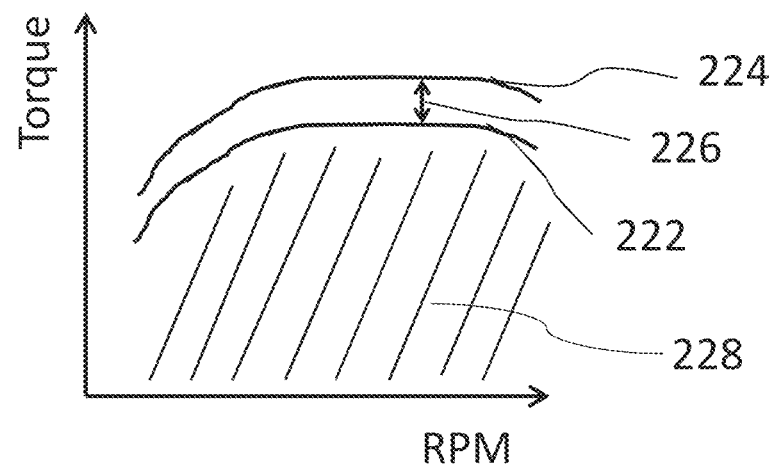
FIG. 8A is a plot of torque as a function of RPM for a system operating a safety factor on an open loop torque limit setpoint in order to avoid engine droop or stall (as is known in the art and FIG. 8B is a plot of torque as a function of RPM for a system according to the invention, the system operating an engine below its engine speed setpoint to thereby avoid engine droop or stall.

With reference to FIG. 8A, in order to avoid engine droop, or stall, it is known to operate industrial vehicles (e.g. excavators) with an open loop torque limit. Such an open loop torque limit is below the maximum engine torque 224 and represents the maximum summed torque that may be provided by all hydraulic machines in combination for a given engine speed (optionally for an engine speed setpoint). Accordingly, there is a range 228 of acceptable engine speeds for a given engine torque. For example, if a vehicle had two hydraulic machines driven by the same engine, each hydraulic machine could be limited such that it could provide, at maximum, 45% of the torque limit, with the result that the sum of the torque from both hydraulic machines would be 90% of the torque maximum (i.e. a safety margin 226 is provided). This choice is made so that the absolute torque limit of the machine is never exceeded (for example when excessive demands are input) to thereby prevent the vehicle from stalling.

Figure 8B:
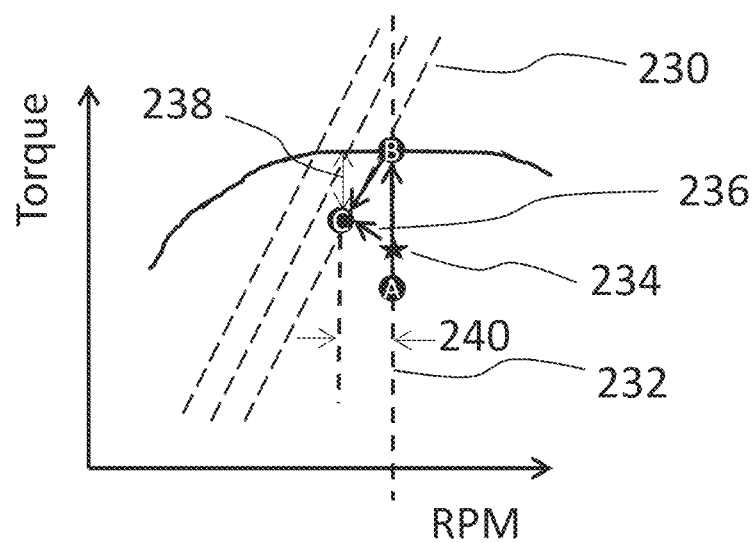

However, by necessity this introduces inefficiencies (as the machine cannot operate at its maximum torque 224 for a given engine speed setpoint). Accordingly, with reference to FIG. 8B, the present invention provides a method of modulating the torque limit according to the engine speed error (where engine speed error is defined in equation 1, above). Here, an increase in hydraulic machine torque above the instantaneous available torque 234 causes the engine speed to decrease, resulting in a proportional increase in engine speed error 240. The engine speed governor detects the engine speed error and responds 236, providing more fuel to thereby increase the available engine torque to maximum. The result of this is that the engine speed approaches a stable value (below the engine speed set point 232) and the engine provides its maximum torque.

During operation the change of engine speed in response to an applied load is the engine droop. Droop is normally expressed as a percentage and can be calculated from the speed of the engine with no load applied ($S_{no\ load}$) and that with a full load applied ($S_{full\ load}$), according to the following equation:

$$\%\ droop = \left( \frac{S_{no\ load} - S_{full\ load}}{S_{full\ load}} \right) \times 100 \qquad (2)$$

In one example embodiment of the invention, a feedforward torque demand is sent from the hydraulic machine controller to the ECU and the ECU calculates what engine load the demand will require of the engine in advance of the hydraulic machine applying the load. This has the advantage of avoiding (or at least limiting) engine droop.

The maximum torque which may be supplied by an engine need not be the same as the maximum torque of a hydraulic machine driven by the engine. In the instance where a hydraulic machine has a shorter characteristic response time than an engine it is advantageous to artificially delay the response time of the ECM. In this way, a demand is anticipated before the load is applied to the engine, allowing time for the engine speed to increase to the point where it can meet the demand, and the load is applied to the engine only when the engine speed has increased to this point.

One skilled in the art will appreciate that the response time of the engine will depend on the current engine speed (i.e. the response time is typically shorter when the engine is operating at a higher speed).

It is known in the art to provide engines with a turbocharger. Such turbochargers themselves have response times, being the period necessary for the turbocharger to respond to a demand on the engine. The response time for a turbocharger is dependent upon a range of factors including the inertia of the turbocharger rotor unit, intake pressure, air flow and intercooler energy transfer. This is significant because the response time of the turbocharger is a further limit on the speed with which the engine can apply a high torque because some time is needed to build sufficient air mass flow rate to the cylinders. Turbochargers are known in the art for their slow response and the delay caused by this is referred to as 'turbo lag'. It is important to account for the effects of the turbocharger when considering the torque response of the engine as a whole. However, it is also possible that some engines may have other features that also slow the response of the engine and these features must also be considered.

The use of pressure reducing means such as pressure relief valves (PRVs) in hydraulic machines (e.g. excavators, etc.) is well known in the art. When the pressure in a fluid manifold reaches a PRV limit, a PRV opens to allow hydraulic fluid to leave the system (typically via an auxiliary passage to a tank at atmospheric pressure) and thereby reduces the pressure. This is a safety feature that prevents damage to the machine.

However, hydraulic fluid that leaves via a PRV represents an inefficiency in that that hydraulic fluid can no longer do work in the system and energy is thus lost. As such, in an embodiment of the invention, a system is provided to avoid reaching the PRV limit and hence to avoid causing a PRV to be opened.

To achieve this, in one example embodiment of the invention, the control signal to the hydraulic machine is limited such that the pressure output by the hydraulic machine cannot exceed a predetermined maximum pressure (e.g. 95% of the PRV pressure). The ECU receives a demand signal (e.g. a signal input by a user via a joystick) and limits $F_d$ such that the predetermined maximum is not reached.

Typically, at least one PRV will be associated with each actuator of a vehicle. For example, where the vehicle is an excavator, at least one PRV will be provided for each track actuator, slew actuator, arm actuator, boom actuator, etc. As each actuator is associated with a different demand, each PRV associated with each actuator optionally has a different PRV limit. Additionally, there may be different PRV limits associated with different movements (for example, a higher PRV limit may be associated with raising an arm and a lower PRV limit associated with lowering an arm). Accordingly, each actuator of a vehicle according to an example embodiment of the invention is provided with a predetermined maximum pressure corresponding to the PRV limit of the said actuator. Additionally, an example embodiment of the invention limiting the pressure involves a PRV associated with a group or groups of actuators, where the limit is associated with the one or more groups. The limit selected for the group may reflect the lowest of the respective actuator pressure limits within the group. The group may encompass all actuators.

In one example embodiment of the invention, this replaces traditional hardware PRVs. Accordingly, some example embodiments of vehicle according to the invention may therefore require fewer (or even no) PRV valves, however in most example embodiments such valves will typically still be required, possibly in order to meet safety requirements. Further to this, the feedback control to the tank can optionally be dispensed with.

In a further example embodiment of the invention, open-centre spool valves are replaced with closed centre spool valves. In use, a user inputs commands (for example, using a joystick) and these inputs are used to a determine displacement demand. This may be done by measuring or monitoring a control signal pressure such as a pilot pressure.

As the input commands may correspond to multiple different displacement demands simultaneously, for example to cause actuation of multiple different actuators simultaneously, the ECU calculates the expected sum of displacement demands on the basis of the input commands of the user. In one example embodiment, the spools valves are controlled via hydraulic joysticks to open in proportion to the displacement command (this requires no electronic control). In an alternative example embodiment, the ECU uses proportional solenoid valves to cause the spool valves to open in proportion to the displacement demand.

In one embodiment, the spool valves have no open centre; this represents an open-loop method of feedback control (i.e. there is no pressure measurement on each side of the central open port, as is the case where an open-centre spool valve is provided, with which to provide feedback to thereby correct any error). Accordingly, a control signal is measured instead. This control signal may be in the form of a pilot pressure and is in the form of a measurement of pressure on the open ports of the spool valves and is used to determine how open the spools are (the pressure on each side of the spool valve is measured, and a lookup table is referred to in order to determine the openness of the port). The pressure and the openness provide information with which the ECU determines the flow and an expected drop in pressure caused by the flow.

This obviates inefficiencies associated with proportional spool valves.

Figure 18:
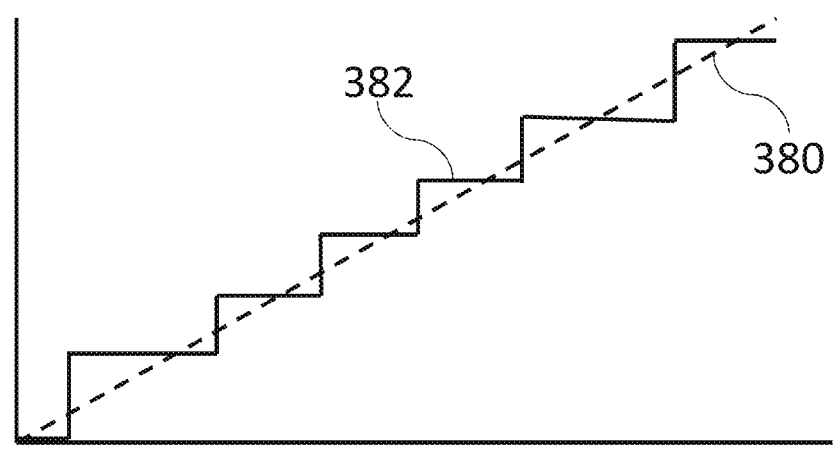
FIG. 18 is a plot of quantised output in response to a received demand signal as a function of time.

The controller is configured to receive a demand signal and determine a series of discrete values where the discrete values representative of displacement of fluid by one or more working chambers, i.e. a pattern of active and inactive cycles of working chamber volume. FIG. 18 is a plot of output as the result of an example series of discrete values (and hence an example pattern of active and inactive cycles of working chamber volume). Over time, the total output of working chamber volume averages such that the hydraulic machine (i.e. $F_d$) meets the demand in response to the demand signal.

A user may input a command (e.g. via a joystick) which causes some displacement demand which is less than 100% of the maximum possible displacement output of the engine. For example, the demand may be for displacement of 88.9% of the maximum possible displacement output and the engine may have 12 cylinders with which to meet that demand. Such a demand is met through a pattern of activation of working chambers causing each individual working chamber to undergo an active or an inactive cycle. In this example, the pattern would be 1 1 1 1 1 1 1 1 0 1 1 1 1 1 1 1 0 1 1 1 1 1 1 1 0, etc (where a 1 represents an active cycle carried out by a working chamber and a 0 represents an inactive cycle carried out by a working chamber).

If such a pattern of active and inactive cycles is carried out when the speed of rotation of the rotatable shaft is 1200 rpm this means that 240 decisions (i.e. choices between an active cycle or an inactive cycle for an individual working chamber) are carried out every second and, in the above example, every 37.5 ms there is an inactive cycle (a "0" in the pattern). As such, this causes a vibration at 26.6 Hz.

As such, the series of discrete values (and/or the pattern of active and inactive cycles of working chamber volume) may be represented as a non-linear function. Optionally, the series of discrete values may be determined with reference to a number of predetermined series of discrete values or from a database, or the controller may carry out one or more calculations to thereby determine the series of discrete values. One skilled in the art will appreciate that the non-linear function is not simply a transfer function and/or a low-pass filter.

Low frequency vibrations caused in this way can lead to damage to parts of the machine (or vehicle) and discomfort to a user. To prevent this, the present invention applies a moving average filter with a variable period to filter the low frequency vibrations. By setting the period of the moving average filter to be equal to the period of the decision pattern that gives rise to the vibrations (in the above example, the period would be 37.5 ms) the low frequency vibration is completely attenuated (as are the harmonics of the vibration). If the period of the pattern of active and inactive cycles is changed, or if the speed of rotation of the rotatable shaft is changed, the period of the moving average filter is also changed in dependence thereon.

Contributions from individual working chamber actuations cause pulsatile pressure ripple. This leads to vibrations in the vehicle, the hydraulic machine, the cab, etc. Although these vibrations typically initiate with relatively low amplitude, the amplitude of the vibrations can increase over time, especially if the frequency of the vibrations is at (or close to) a resonant frequency of the vehicle (or part of the vehicle). These vibrations can cause damage if the amplitude increases beyond a predetermined maximum amplitude.

In addition, as changes in pressure are used to allow decisions to be made (e.g. a decision to change Fd, etc) small changes in pressure caused by pulsatile pressure ripple could be misinterpreted as real, deliberate pressure changes, which could lead to a decision being made in error. A low-amplitude ripple-reject filter prevents this.

The low amplitude ripple reject filter is a non-linear function (not a transfer function or a low-pass filter). These are two ways, i.e. common objective, of suppressing ripple on a higher-level system.

In order to control the torque of a hydraulic machine, it is necessary to know the pressure at the hydraulic machine outlet. Hydraulic machine torque arising from a variable displacement hydraulic machine is a function of the hydraulic machine displacement and hydraulic machine outlet pressure. There is an inherent pulsatile pressure ripple at the outlet due to contributions from individual cylinder actuations. Use of unfiltered pressure could result in fast decrease or increase in hydraulic machine torque which would be beneficial for engine stability and maximising hydraulic machine productivity. However, due to the pressure ripple, use of unfiltered pressure for torque control would result in unstable displacement. In order to remove this pressure ripple from torque calculations, one might use a heavily averaged or filtered pressure, but this would result in a lagged torque response (undesirable delay).

An ideal filter of pressure for torque control would therefore reject low-amplitude pressure ripple but accept high-amplitude pressure changes. Accordingly, the low amplitude ripple-reject filter retains the previous output value of the filter and compares the new input pressure to this retained value. If the difference between the new pressure and the retained pressure value is within a rejection band ('deadband'), the output pressure is held constant and is not modified. If the new pressure is outside of the rejection band, the output pressure is modified to this new value. Thus, the pressure ripple does not influence the hydraulic machine torque control, but large changes in pressure (not ripple) are accounted for. The range of the deadband is set on expectation of a particular range of pressure pulsation—e.g. 20 bar pressure pulsation. The deadband is typically tuned and set for the specific hydraulic system to which it is fitted. However, the band may change if the compliance/stiffness of the hydraulic system changes (e.g. if an accumulator is provided).

The hydraulic machine controller applies a torque limit where the hydraulic machine torque limit is above a torque limit of the engine. The torque limit is dependent on the current engine speed. Hence, the engine controller receives a measurement of the current engine speed and determines a corresponding engine torque limit, with reference to a lookup table (e.g. a lookup table stored in a database) containing a torque-speed curve.

Additionally, at all engine speeds, the maximum torque that the engine can apply will be lower than the maximum torque that can be applied by the hydraulic machine. As a result, a torque limit is applied to the hydraulic machine.

Figure 11A:
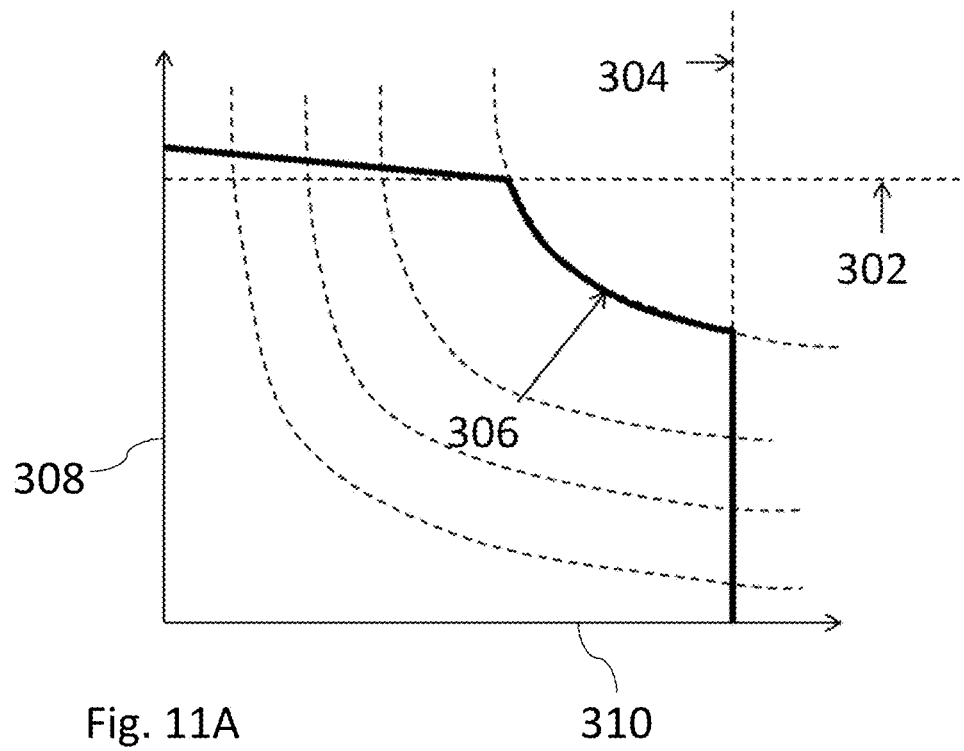
FIG. 11A is a plot of pressure as a function of flow for a given flow demand and FIG. 11B is a plot of pressure as a function of flow for a given displacement demand.
Figure 11B:
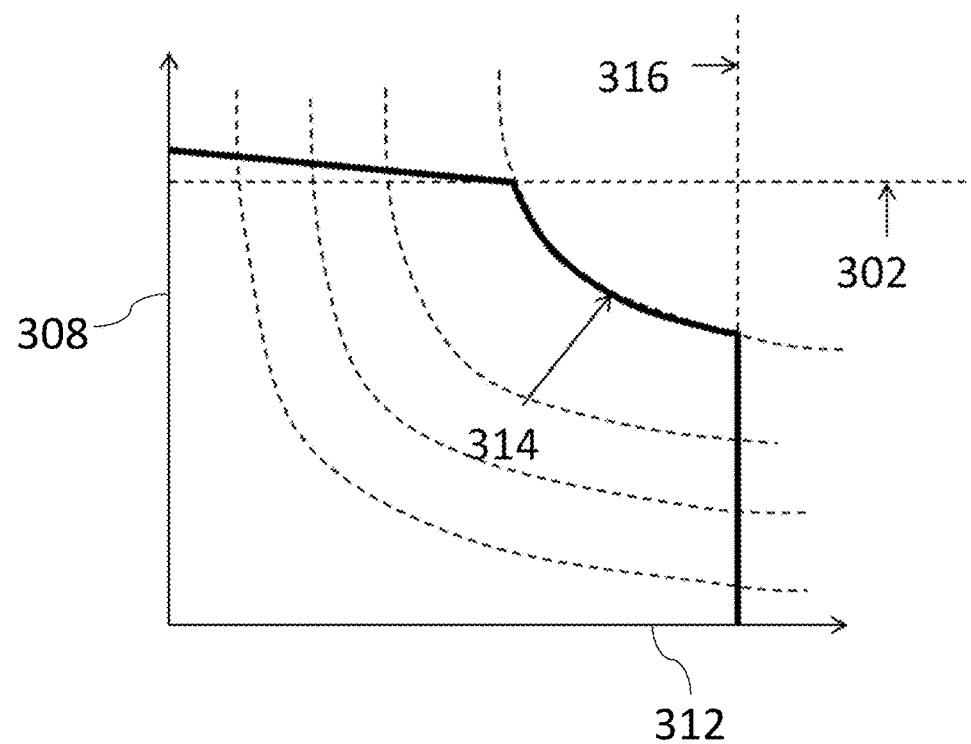

For example, the demand signal may be a signal containing parameters associated with displacement, flow, pressure, power or torque demand. These parameters are limited in dependence on other parameters. With reference to FIG. 11A, in one example, the displacement may be reduced from a maximum flow 310 to zero displacement across a range of pressures 308, resulting in a non-linear function representing a limit on power demand 306 which depends on pressure demand 302 and flow demand 304. With reference to FIG. 11B, in a further example, the torque demand 314 may be limited in a similar way, such that a maximum torque may be applied for certain values of pressure 308 and displacement 312 but may be reduced to zero torque across a pressure range in dependence on displacement pressure demand 302 and displacement demand 316.

Figure 12:
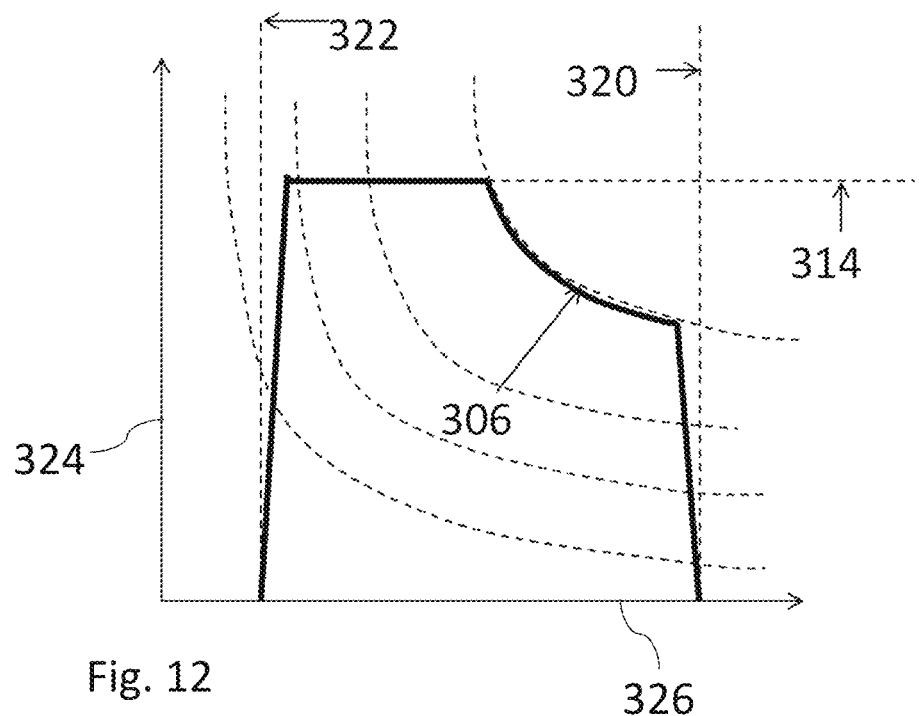
FIG. 12 is a plot of torque as a function of RPM indicating power demand and taking into account minimum and maximum engine speeds to prevent stall and internal machine damage.

FIG. 12 is a plot of an example power demand function 306 as a function of engine speed 326 and torque 324, with reference to a minimum speed demand 322 and a maximum speed demand 320. The hydraulic machine controller applies a torque limit as a function of engine speed. At low speed, the hydraulic machine controller reduces the torque limit to prevent engine stall. Conversely, at high speed, the hydraulic machine controller increases the torque limit to prevent damage to the hydraulic machine.

Figure 13:
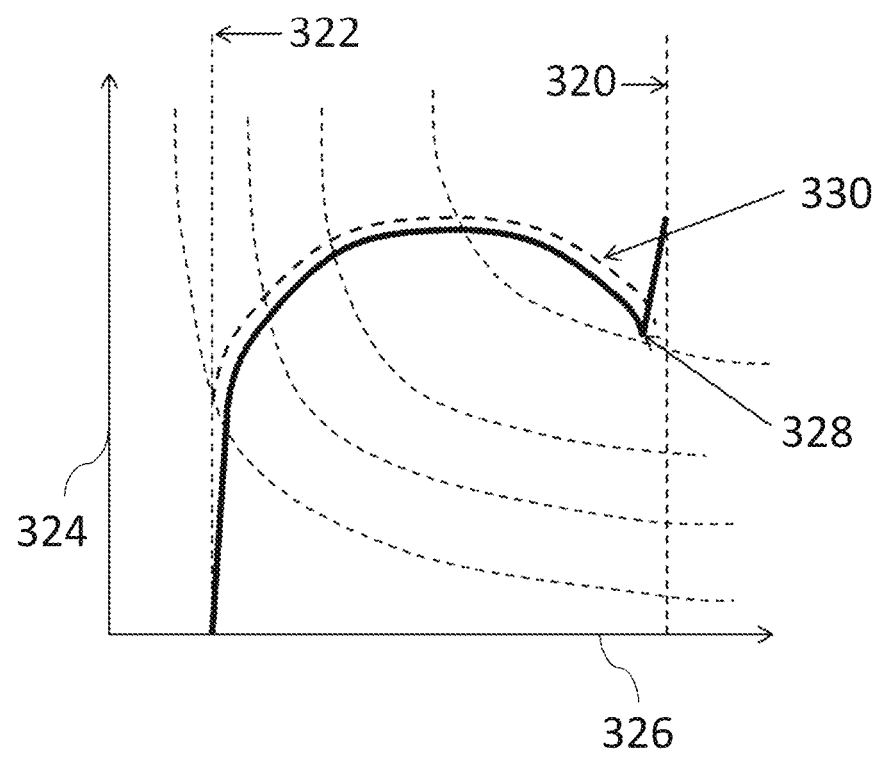
FIG. 13 is a plot of torque as a function of RPM indicating torque vs speed limit of a machine and torque vs speed limit of an engine where the torque limit of a machine is increased at high speed.

In an example, the torque limit may be set as a function of speed to match the available torque of the engine. FIG. 13 is a plot of an example of torque functions; a torque function representing torque determined in accordance with available engine speed 330 and a torque function determined in accordance with available hydraulic machine speed 328, where the torque 324 is plotted as a function of both engine speed 326 and with reference to a minimum speed demand 322 and a maximum speed demand 320. At low speed, the torque of the hydraulic machine is limited to prevent engine stall. Conversely, at high speed, the torque of the hydraulic machine is limited prevent internal damage.

In an alternative example, at high speed the hydraulic machine torque may be increased (as shown by curve 328) to cause the engine speed to reduce until the load on the hydraulic machine corresponds to the available engine torque. This takes place over a short time period until the engine speed reduces.

Figure 14:
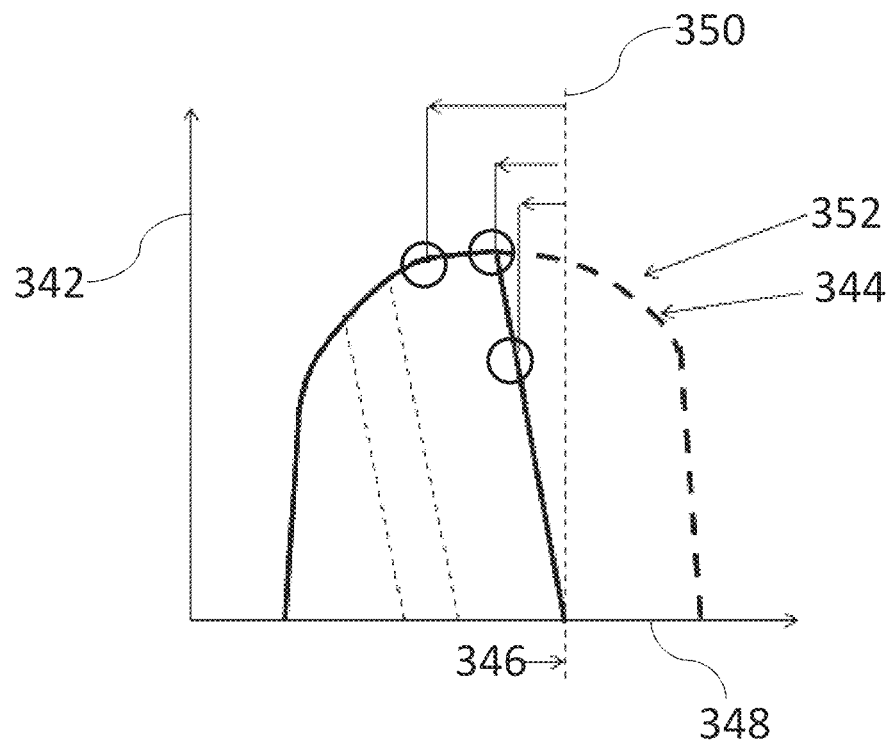
FIG. 14 is a plot of torque as a function of RPM wherein an engine governor provides an engine speed setpoint such that the total load on the engine may be estimated with reference to the engine droop.

FIG. 14 is a plot of engine torque 342 as a function of engine speed 348 to indicate change in torque with engine droop 350 as is known. In an example of the invention where the engine governor applies an engine speed setpoint 346 the total load on the engine is determined by measuring engine droop. The hydraulic machine torque is limited in response to the measured droop such that the engine torque limit is not exceeded. The steady torque as a function of the maximum engine speed 352 tracks the torque as a function of the maximum hydraulic machine speed 344.

Figure 15:
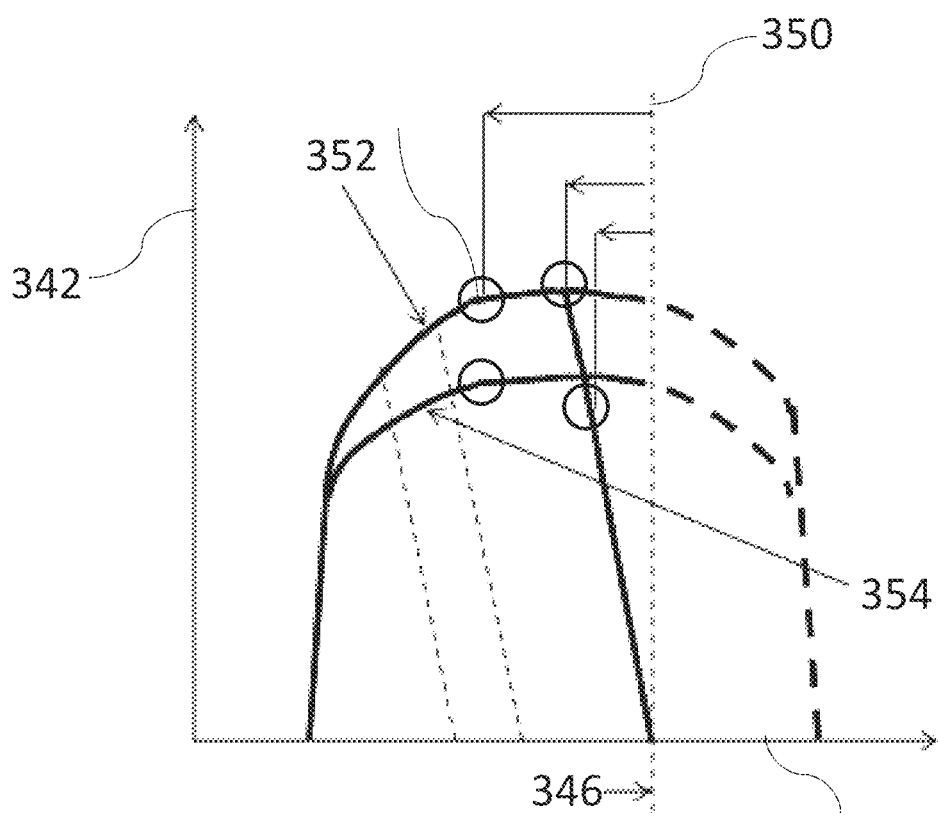
FIG. 15 is a plot of torque as a function of RPM for an engine having a limited rate of change of torque output.

FIG. 15 is a plot of engine torque 342 as a function of engine speed 348 to indicate change in torque with engine droop 350 as is changed as a result of an example embodiment of the invention. The steady torque as a function of the maximum engine speed 352 may be compared to the instant torque as a function of the engine speed 354. The hydraulic machine controller may apply an instant torque limit which is lower than the steady torque capability of the engine. This is advantageous where an engine has a turbocharger as a turbocharger will have some inertia which, in turn, causes an increase the time the engine takes to increase its output torque.

Figure 16:
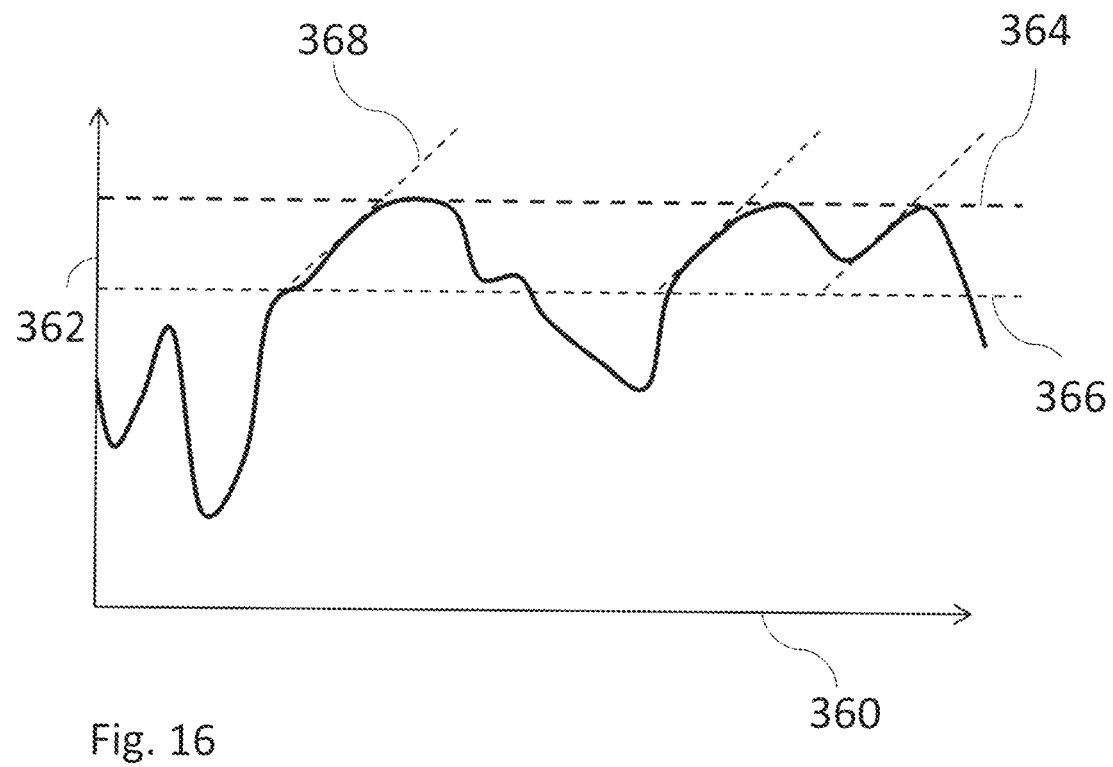
FIG. 16 is a plot of torque as a function of time with various torque limits imposed.

FIG. 16 is a plot of torque 362 as a function of time 360 indicating an example of torque response to a steady torque limit 364, an instant torque limit 366 and a slew rate limit 368.

Figure 17A:
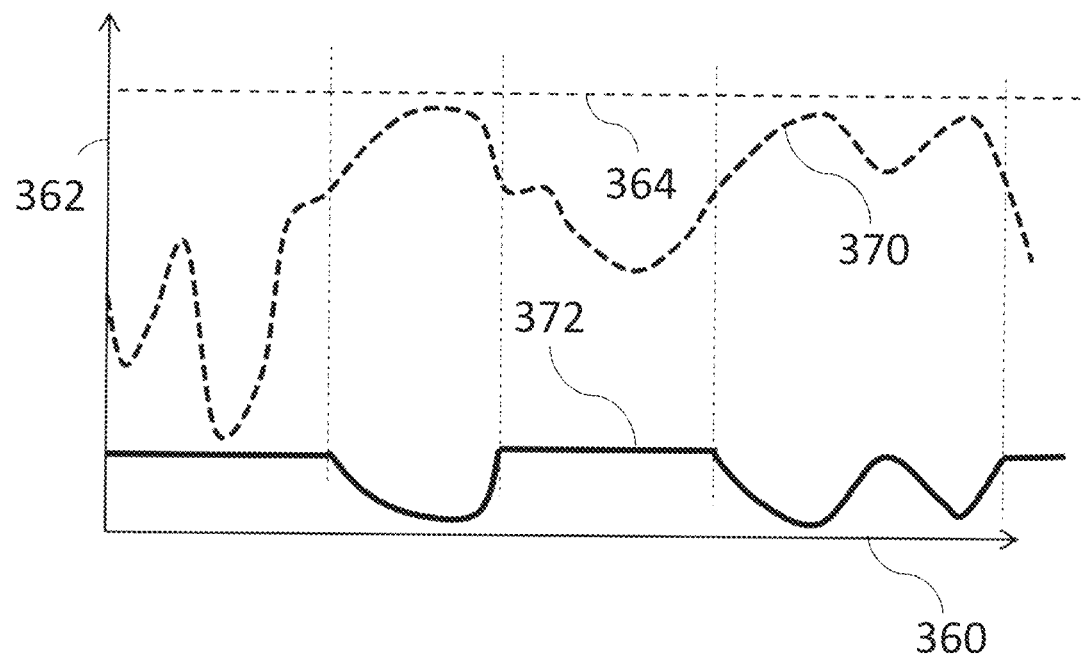
FIGS. 17A and 17B are plots of torque as a function of time for variable demands of two hydraulic actuators in a system having a torque limit.
Figure 17B:
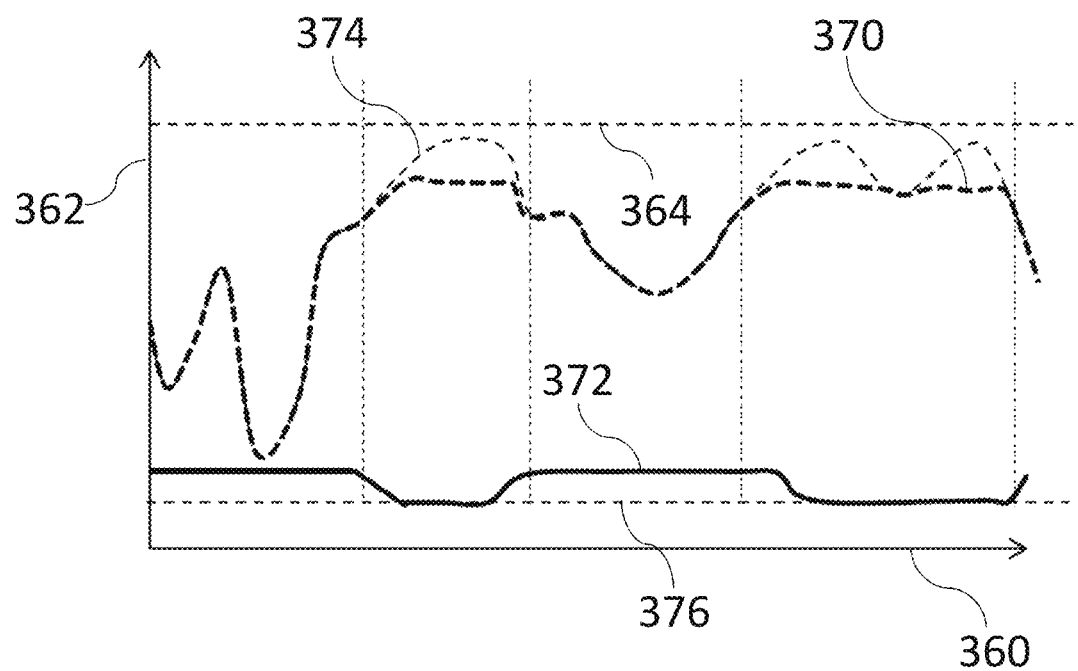

FIGS. 17A and 17B are plots of torque 362 as a function of time 360 indicating torque response associated with a first and second outlet of a hydraulic machine without exceeding a predetermined torque slew limit 368. 370 is the actual torque associated with the first outlet of the hydraulic machine and 372 is the actual torque associated with the second outlet of the hydraulic machine. 374 is the torque demand associated with the first outlet of the hydraulic machine. 376 is the guaranteed amount of torque associated with the first outlet. As understood in the art, these outlets are simply fluid connections to (one or more working chambers of) the hydraulic machine which act as outlets when the machine operating in a pumping mode and as inlets when the hydraulic machine operated in a motoring mode. In an example, the torque demand of a second actuator may be restricted and de-prioritised because the first actuator is of greater importance and as such the total torque is divided such that more torque is available for the first actuator than is available for the second actuator.

FIG. 18 is a plot indicating an example of how a continuous demand signal 380 may be quantised 382 into discrete steps. Although the quantised steps may be equally spaced in amount of demand (e.g. displacement) this is not necessary.

What is claimed is:

1. An apparatus comprising a prime mover and a plurality of hydraulic actuators, a hydraulic machine having a rotatable shaft in driven engagement with the prime mover and comprising a plurality of working chambers having a volume which varies cyclically with rotation of the rotatable shaft, a hydraulic circuit extending between a group of one or more working chambers of the plurality of working chambers of the hydraulic machine and one or more hydraulic actuators of the plurality of hydraulic actuators, each working chamber of the plurality of working chambers of the hydraulic machine comprising a low-pressure valve which regulates a flow of hydraulic fluid between the working chamber and a low-pressure manifold and a high-pressure valve which regulates the flow of hydraulic fluid between the working chamber and a high-pressure manifold, the hydraulic machine being configured to actively control at least the low-pressure valves of the group of one or more working chambers to select a net displacement of hydraulic fluid by each working chamber on each cycle of working chamber volume, and thereby the net displacement of hydraulic fluid by the group of one or more working chambers, responsive to a demand signal, wherein the apparatus comprises a machine controller which is operable to apply a torque limit to the hydraulic machine, the hydraulic machine torque limit being selected to be below a prime mover torque limit, wherein the hydraulic machine torque limit is selected in dependence on a current prime mover speed, and wherein the hydraulic machine controller is further operable to cause the hydraulic machine to implement one or more rates of change of torque.

2. An apparatus according to claim 1 wherein operating the hydraulic machine controller to cause the hydraulic machine to implement one or more rates of change of torque is in dependence on a parameter selected from a group of parameters consisting of an RPM, a current torque, an additional temporary torque limit, a maximum prime mover torque and a safety factor.

3. An apparatus according to claim 2 wherein the one or more rates of change of torque comprises a first rate of change of torque and a second rate of change of torque and the hydraulic machine controller is operable to cause the hydraulic machine to implement the first rate of change of torque when the prime mover is operating below the additional temporary torque limit and the second rate of change of torque when the prime mover is operating at or above the additional temporary torque limit, optionally wherein the first rate of change of torque is faster than the second rate of change of torque.

4. An apparatus according to claim 1, wherein the group comprises a plurality of groups of working chambers and the demand signal comprises a group of demand signals, wherein each of the groups of working chambers has a respective demand signal, and wherein the controller implements the torque limit while prioritising the torque of one or more said groups of working chambers over the torque of one or more other said groups of working chambers, or wherein there is a plurality of said groups of working chambers and wherein in at least some circumstances, the controller causes one or more of said groups of working chambers to carry out motoring cycles while one or more other of said groups of working chambers carry out pumping cycles, to thereby use torque from the motoring to supplement the engine torque and thereby assist the torque generated by said pumping.

5. An apparatus according to claim 1 wherein the apparatus is a vehicle.

6. An apparatus according to claim 1 wherein the apparatus is an excavator.

7. An apparatus according to claim 1, wherein the apparatus further comprises one or more additional hydraulic machines.

8. An apparatus according to claim 1, wherein the machine controller is operable to receive a measurement of current prime mover speed.

9. A method of operating an apparatus, the apparatus comprising a prime mover and a plurality of hydraulic actuators, a hydraulic machine having a rotatable shaft in driven engagement with the prime mover and comprising a plurality of working chambers having a volume which varies cyclically with rotation of the rotatable shaft, a hydraulic circuit extending between a group of one or more working chambers of the hydraulic machine and one or more of the hydraulic actuators,
  each working chamber of the hydraulic machine comprising a low-pressure valve which regulates the flow of hydraulic fluid between the working chamber and a low-pressure manifold and a high-pressure valve which regulates the flow of hydraulic fluid between the working chamber and a high-pressure manifold,
  the hydraulic machine being configured to actively control at least the low-pressure valves of the group of one or more working chambers to select the net displacement of hydraulic fluid by each working chamber on each cycle of working chamber volume, and thereby the net displacement of hydraulic fluid by the group of one or more working chambers, responsive to a demand signal,
  the method characterized by applying a torque limit to the one or more hydraulic machines, the hydraulic machine torque limit being selected to be below a prime mover torque limit, wherein the hydraulic machine torque limit is selected in dependence on a current prime mover speed,
  wherein the method comprises causing the hydraulic machine to implement one or more rates of change of torque.

10. A method according to claim 9, wherein causing the hydraulic machine to implement one or more rates of change of torque is in dependence on the RPM, the current torque, an additional temporary torque limit, the maximum prime mover torque and/or a safety factor.

11. A method according to claim 9, wherein causing the hydraulic machine to implement one or more rates of change of torque, wherein the one or more rates of change of torque comprises a first rate of change of torque and a second rate of change of torque and the hydraulic machine controller is operable to cause the hydraulic machine to implement the first rate of change of hydraulic machine torque when the prime mover is operating below an additional temporary torque limit, which is lower than the prime mover torque limit and the second rate of change of hydraulic machine torque when the prime mover is operating at or above the additional temporary torque limit, optionally wherein the first rate of change of torque is faster than the second rate of change of torque.

12. A method according to claim 9, wherein the prime mover is configured to provide displacement to two or more actuators, and the method may comprise applying, a different torque limit on the hydraulic machine, in response to a demand associated with each actuator.

13. A method according to claim 9, comprising receiving one or more signals and thereby determining the current torque applied to the hydraulic machine, and may comprise subsequently increasing or decreasing the torque limit in response to the one or more signals, wherein the one or more signals are signals associated with a measurement of speed error, available torque, engine load, and/or one or more pressure measurements.

14. A method according to claim 9, comprising receiving a measurement of outlet pressure and a value representative of displacement demand and calculating an estimate of exerted torque by calculating a product of outlet pressure and displacement demand or comprising receiving a measurement of the rotational speed of the rotatable shaft and a value representative of displacement demand and thereby calculating an estimate of the flow delivered, optionally by calculating a product of displacement demand and speed of rotation of the rotatable shaft.

15. A method according to claim 9, comprising receiving a measurement of the rotational speed of the rotatable shaft and calculating an estimate of exerted torque and optionally further calculating an estimate of the mechanical power absorbed, or calculating an estimate of the flow delivered and optionally further calculating an estimate of the fluid power, optionally further comprising receiving one or more further parameters associated with the hydraulic machine to thereby improve the said estimate of the mechanical power absorbed or the fluid power, wherein the one or more further parameters associated with the hydraulic machine are parameters of volumetric displacement and mechanically efficiency, taking into account pressure, speed and/or temperature.

16. A method according to claim 9, comprising receiving a measurement of current pressure, calculating a displacement limit required to exert a torque at the said pressure and limiting the output displacement such that it does not exceed the displacement limit to thereby limit the torque.

17. A method according to claim 9, comprising receiving a measurement of current rotational speed of the rotatable shaft, calculating a displacement limit required to supply a flow at the said rotational speed of the rotatable shaft and limit the output displacement such that it does not exceed the displacement limit to thereby limit the flow or comprising receiving a measurement of current pressure, and current rotational speed of the rotatable shaft, and calculating a displacement limit required to absorb a power at the said pressure and rotational speed and limit the output displacement.

18. A method according to claim 9, comprising receiving and/or calculating an estimate of the available torque of the prime mover and setting a hydraulic machine torque limit wherein the torque limit is dependent on the prime mover speed.

19. A method according to claim 9 wherein the apparatus is a vehicle.

20. A method according to claim 9, wherein the apparatus further comprises one or more additional hydraulic machines.

21. A method according to claim 9 wherein the apparatus is an excavator.

22. A method according to claim 9, wherein the method comprises receiving a measurement of current prime mover speed.

\* \* \* \* \*